US012711953B1

(12) United States Patent
Gupta et al.

(10) Patent No.: US 12,711,953 B1
(45) Date of Patent: Aug. 18, 2026

(54) CONTEXT DATA REDUCTION IN LANGUAGE MODEL PROCESSING

(71) Applicant: Amazon Technologies, Inc., Seattle, WA (US)

(72) Inventors: Ruchita Gupta, Redmond, WA (US); Sravan Babu Bodapati, Fremont, CA (US); Subendhu Rongali, New York, NY (US); Yannick Nicolas Versley, Aachen (DE); Kanthashree Mysore Sathyendra, Sunnyvale, CA (US); Wael Hamza, Wylie, TX (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 18/898,847

(22) Filed: Sep. 27, 2024

(51) Int. Cl.
*G10L 15/00* (2013.01)
*G06F 40/284* (2020.01)
(Continued)

(52) U.S. Cl.
CPC .......... *G10L 15/183* (2013.01); *G06F 40/284* (2020.01); *G10L 15/22* (2013.01); *G10L 2015/223* (2013.01)

(58) Field of Classification Search
CPC . G10L 15/183; G10L 15/22; G10L 2015/223; G10L 15/005; G10L 15/26; G10L 17/18; G06F 40/284; G06F 16/243; G06F 16/248; G06N 3/045; G06N 3/092; G06N 5/04; G06N 3/0442; G06N 3/044; G06N 3/0475; G06N 3/0464; G06N 3/091; G06N 3/09; G06N 3/0895; G06N 3/088;
(Continued)

(56) References Cited

U.S. PATENT DOCUMENTS

2022/0358908 A1* 11/2022 Gandhe ................. G10L 15/065
2025/0217371 A1* 7/2025 Hamid .................. G06F 40/174
2025/0335711 A1* 10/2025 Wang ...................... G10L 15/07

OTHER PUBLICATIONS

Zandieh, Amir, et al. "Subgen: Token generation in sublinear time and memory." arXiv preprint arXiv:2402.06082 (2024). (Year: 2024).*

(Continued)

*Primary Examiner* — Edgar X Guerra-Erazo
(74) *Attorney, Agent, or Firm* — Pierce Atwood LLP

(57) ABSTRACT

A natural language processing system that determines which sections of context data are most relevant to a natural language input for purposes of determining a response. The system determines positional encoding data to encode positions of long sections of context data to enable processing of context data that may exceed a model's context window. The system uses attention score data from a language model to determine the relevance of particular sections of context data to the natural language input. Attention scores may be added to determine the relevance of particular context tokens. Initial and final sections of context data portions may also be preserved. Top scoring/most relevant portions of context data are used to determine a response to the natural language input. For example, model processing data, such as key-value data, from the most relevant sections are stored in a cache while model processing data for lesser relevant context data portions are removed/not stored in the cache and not used to determine the response.

20 Claims, 9 Drawing Sheets

(51) Int. Cl.
*G10L 15/183* (2013.01)
*G10L 15/22* (2006.01)

(58) Field of Classification Search
CPC ........ G06N 3/094; G06N 3/096; G06N 3/098; G06N 20/10; G06N 20/00; G06N 20/20
See application file for complete search history.

(56) References Cited

OTHER PUBLICATIONS

Zhenyu Zhang, et al. "H2O: Heavy-Hitter Oracle for Efficient Generative Inference of Large Language Models." arXiv preprint arXiv:2306.14048v3, Dec. 18, 2023, 49 pages.
Zhuoshi Pan, et al. "LLMLingua-2: Data Distillation for Efficient and Faithful Task-Agnostic Prompt Compression." arXiv preprint arXiv:2403.12968v1, Mar. 19, 2024, 18 pages.
Woomin Song, et al. "Hierarchical Context Merging: Better Long Context Understanding for Pre-Trained LLMs." Published as a conference paper at ICLR 2024, arXiv preprint arXiv:2024.10308v1, Apr. 16, 2024, 19 pages.
Joshua Ainslie, et al. "CoLT5: Faster Long-Range Transformers with Conditional Computation." arXiv preprint arXiv:2303.09752v3, Oct. 24, 2023, 14 pages.

* cited by examiner

CONTEXT DATA REDUCTION IN LANGUAGE MODEL PROCESSING

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

DETAILED DESCRIPTION

Figure 1:
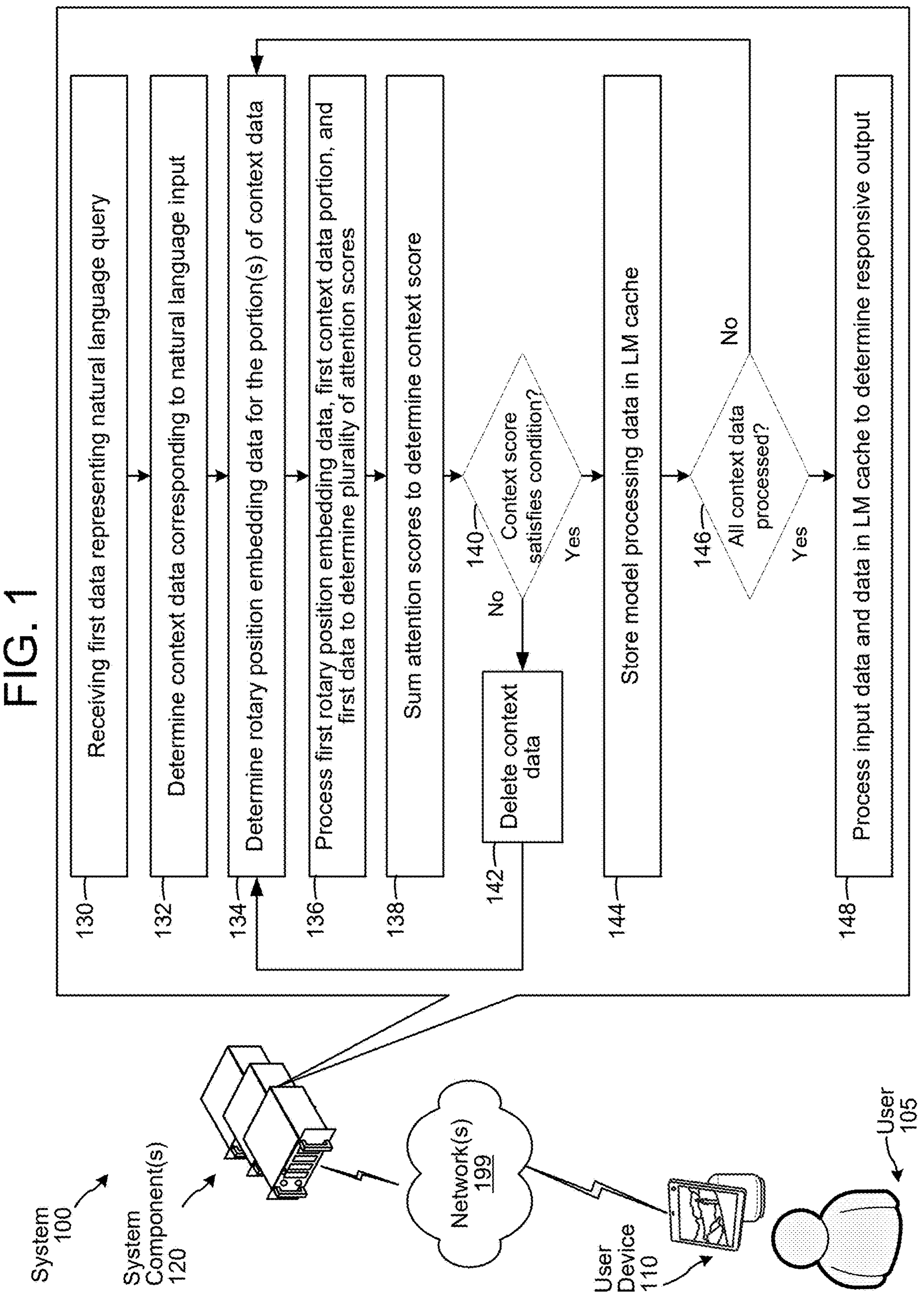
FIG. 1 is a conceptual diagram illustrating operations to be performed for context data reduction, according to embodiments of the present disclosure.

Natural language processing (NLP) is a field of computer science, artificial intelligence, and linguistics concerned with processing a user command input in the form of a natural human language (e.g., English, Chinese, etc.). Such a natural language command may come in the form of audio, text, image, or other format. Natural language processing may involve a number of different specific processing techniques such as those discussed below. Automatic speech recognition (ASR) is a field of computer science, artificial intelligence, and linguistics concerned with transforming audio data associated with speech into a textual or other token representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system, and a single component can be used to input audio and output a natural language understanding of any speech in the audio. Synthesized speech generation (SSG) (including text-to-speech (TTS)) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent speech in audio data and, using one or more models, the embedding data is processed to generate audio data and/or a system command (such as an application programming interface (API) call) responsive to the speech. Language modeling (LM) is the use of various statistical and probabilistic techniques to determine the probability of a given sequence of words occurring in a sentence. LM can be used to perform various tasks including understanding a natural language input and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device. Alternatively, or in addition, the device itself may perform all or a portion of such processing.

In some instances, the system may be configured to process input text data (such as ASR data or text entered into a user interface or extracted from an image using optical character recognition) using one or more language models (e.g., one or more large language models (LLMs)) to determine a response to the user input. For example, in response to a user input of "what is the history of the United States," the language model(s) may output a synopsis of the history of the United States of America.

An artificial intelligence (AI)/machine learning (ML) system may use ASR, NLU, NLG, and/or TTS, each with and/or without its own and/or a shared language model, for processing user inputs, including natural language inputs (e.g., typed, displayed, and spoken inputs) and other type of inputs (e.g., inputs not received from a user, inputs received from a system component, inputs representing occurrence of events, etc.).

The AI system may use other types of generative models including a model that processes audio/speech as an input and outputs audio/synthesized speech (a speech-to-speech model). Another example generative model that may be used is a multi-modal model that processes two or more types of data (e.g., audio, text and/or image) as inputs and/or outputs two or more types of data (e.g., audio, text and/or image).

To process a user input query, such as a natural language input, the processing system may identify and use certain context data in such processing. Context data may include a variety of types of data that the system may determine potentially relates to the input user query. For example, for a user query of "summarize these documents," where the input includes a number of documents/files the system may determine that the query to be responded to is "summarize these documents" while the context data relevant to the query may be the attached documents/files. In another example, for a user query of "summarize what happens in Act I of Romeo and Juliet" the system may determine that Act I of the play Romeo and Juliet is related context data for processing the user query. In still another example, for a user query of "dim the lights" the system may determine that related context data includes the user ID/profile, the user's location, the available lights (and their respective brightness), permission data, etc. Context data can include many different types of information including user context, device context, environmental context, dialog context, and a variety of other kinds of information, some of which is explicitly described herein as example context data, but other kinds of context data are also contemplated.

As can be appreciated, for certain kinds of user inputs, context data (either included in the input or otherwise determined) may be large. For example, a user query such as "explain to me some themes across the works of Shakespeare" may involve context data including a large portion of Shakespeare's works. A user query such as "show me the top moments of the game last night" may involve context data that includes video, audio, etc. of a sporting event. A user query of "summarize these documents" may involve large amounts of context data included as part of an input. Processing such context data using an LLM may consume a significant amount of computing resources. Further, certain LLMs may operate with constraints on the length of processable context data, such as memory constraints for a certain instance of processing, latency constraints, length limitations of what the model has previously processed, limited cache size, etc.

For example, the maximum number of context tokens a model (such as an LLM) may be able to process during a pass may be referred to as the context window. The context window represents a number of tokens that the language model is trained to keep track of (e.g., remember) when processing a prompt input. The size of the context window may depend on the size of a memory/cache of the model allocated to context data. While context windows are important to enable models to retain information during a processing session (and thus enabling them to consider a broader range of input information and to generate more coherent and contextually relevant responses) such windows are limited in size. When a model is trained, it may be trained with a particular context window size. If the number of tokens included in the prompt input exceeds the context window, the language model's reasoning and generation capabilities may be impacted (e.g., accuracy and/or efficiency may be reduced). For example, the language model may "forget" earlier portions (e.g., tokens) of the prompt input. As such, the length of a prompt input (which can include, for example, a long user input, a conversation including user inputs and system responses, contextual information relevant for processing a user input, etc.) may be limited to the context window of the language model.

The context window for a language model can be extended/increased by training the language model using a dataset including inputs of a certain length (e.g., lengthy inputs), but such training may take extended periods of time and quality datasets having lengthy inputs may be difficult to obtain. Further, expanding a context window presents run-time computing challenges as well. Specifically, the memory required for attention mechanisms increases significantly with longer context lengths. This results in higher memory usage and computational costs. Supporting longer contexts becomes a bottleneck due to the quadratic computational complexity and linear memory complexity growth associated with the attention computation as the sequence length increases.

Offered is a system and method that determine what portions of context data are most relevant to a particular user input query, allowing the caching and processing of those most relevant portions and deletion/other removal for those portions that are not most relevant. As described, this will reduce the amount of context data maintained and processed by an LLM when determining a response to a particular user input. This may allow the LLM to operate with a fixed token/memory budget, thus allowing a more optimal tradeoff between accuracy and use of computing resources. Such offered solutions may also allow an LLM or other machine learning model to operate with less latency and potentially less hardware and thus reduced computing resources and lower cost.

To achieve such context data reduction the system may divide context data into portions, determine positional embedding data for each portion, and determine a relevance of each portion using model-determined attention scores for each portion relative to an input query. To allow processing of large amounts of context data, the system may rescale positional indices used by the language model to keep track of the tokens included in a prompt input. Such rescaling may involve rotational positional encoding which may comprise the positional embedding data. The scores indicating the relevance of a portion of context data may be referred to as a relevance score/context score for that segment of context data. The most relevant portions of the context data (as well as initial/final segments of context data portions) may be stored. Data for the top scoring tokens of context data are maintained, while lower scoring portions are removed from a memory cache of the model (such as the key-value (KV) cache). Ultimately the top scoring context data tokens are maintained and used to process an input query and determine a response. In this manner the system allows model processing to consider contextual data beyond what would otherwise be possible given the model's context window, thus enabling longer context inputs while maintaining consistent LLM memory and computation constraints. Further details of these operations are discussed below.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models, that is they are configured to generate a sequence of data (for example representing text) based on input data, such as one more text prompts. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model.

In some embodiments, the language model(s) may be transformer-based sequence to sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and Amazon Web Services (AWS) Titan family of generative models.

In other embodiments, the language model(s) may be a decoder-only architecture. The decoder-only architecture may use left-to-right (unidirectional) encoding of the input (e.g., audio, text, image, video, etc.). Examples of such language models include others in the Amazon Alexa and AWS Titan family of models as well as the Generative Pre-trained Transformer 3 (GPT-3), GPT-4, and other versions of GPT. GPT-3 reportedly has a capacity of (approximately) 175 billion machine learning parameters. GPT-4 reportedly has a capacity of (approximately) 1.76 trillion machine learning parameters.

Other examples of language models include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models (e.g., discriminative models) instead of or in addition to the generative model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to a generative model may be in the form of a prompt. A prompt may be a natural language input, for example, a directive or request, for the generative model to generate an output according to the prompt. The output generated by the generative model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the generative model may output a recipe (e.g., a step-by-step process represented by text, audio, image, video, etc.) to cook rice. As another example, for an example prompt "I am hungry. What restaurants in the area are open?", the generative model may output a list of restaurants near the user that are open at the time of the user prompt.

The generative models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. Few-shot learning may be implemented by including examples (exemplars) in a prompt to the model and the model may perform in-context learning. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning with regard to other data. Other learning techniques may involve performing offline/training operations for fine-tuning (e.g., using supervised fine-tuning techniques) a pre-trained generative model for a particular task.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to multiple related user inputs and system outputs (e.g., through user device(s)) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

FIG. 1 illustrates operations performed by a system 100 to reduce context data for processing by a language-model to determine an action to be performed in response to a user input and determine a response to be presented to a user 105. Various operations illustrated in FIG. 1 may be performed by a context scoring component 330 (discussed below) and/or by other system components. As shown in FIG. 1, the system 100 may include a user device 110, local to the user 105, in communication with one or more system component(s) 120 via a network(s) 199. The network(s) 199 may include the Internet and/or any other wide- or local-area network, and may include wired, wireless, and/or cellular network hardware. Various components of system 100 are discussed below and shown in other figures, however system component(s) may operate a language model (such as language model 245 shown in FIG. 2) to perform natural language processing of a user input and context data selection/reduction related to a natural language input query.

As shown in FIG. 1, the system 100 may receive (130) natural language input data corresponding to an input to the system 100. That natural language input data may include first data representing a natural language query. For example, user 105 may speak an utterance to user device 110 and the device 110 may convert the sound of the utterance to audio data which is then sent from device 110 to system component(s) 120 over the network(s) 199. Alternatively, or in addition, the user may provide some other natural language input to device 110 (for example a text based input, a selection of a virtual button representing some natural language, etc.) and data representing that natural language input may be sent from device 110 to system component(s) 120 over the network(s) 199. Although certain steps herein are illustrated as being performed by system component(s) 120, depending on system configuration, certain steps may instead be performed by device 110 without departing from the present disclosure.

The system component(s) 120 may receive (130) the first data representing the natural language query and may determine (132) context data corresponding to the natural language input. In certain instances, the user input may include both the query and the context data. For example, the user may provide an input to the system of "please summarize these documents" along with a collection of files. The portion of "please summarize these documents" may correspond to a query portion of the input and the collection of files may correspond to the context data. Thus, determination (132) of the context data may involve figuring out from an overall input what part of it is the query and what part of it is context data. In certain instances, the system may determine other context data (e.g., context data that is not necessarily included with the input) that may potentially be relevant to responding to the query. Determination of such context data is described in further detail below, for example in reference to FIG. 3. The system component(s) 120 may then determine (134) rotary position embedding data for the portions of the context data. The rotary position embedding data may correspond to the first portion's position within the context data. Thus, for context data including portions A, B, C, etc. each portion of context may have its own rotary position embedding data so context portion A may have rotary position embedding data A, context portion B may have rotary position embedding data B, etc. Such rotary position embedding data may be determined using LongRoPE techniques as described below and provides the language model with some information about how a particular piece of context data relates to the overall context data. The system may then process (136) a first context data portion, first rotary position embedding data corresponding to the first context data portion, and first data representing the natural language query using a language model (LM), for example, an LLM, to determine attention score data (such as a plurality of attention scores) and model processing data. The first data and portion of the context data may be encoded in a form suitable for processing by a machine learning model. The attention score data may be taken from different layers of the LM, as described below in reference to FIG. 4. The model processing data may include key-value data and/or hidden representation/state data determined by one or more layers of the LM as a result of processing the portion of context data, as described below in reference to FIG. 4. The system component(s) 120 may sum (138) the plurality of attention scores to determine a context score. The context score may be the sum of the attention scores, an average of the attention scores, or the like. The context score may represent a relevance of the first context portion to the natural language input. That is, how important the first context portion is to determining a potential response to the natural language input, and whether the data related to that first context portion should be used in determining the response.

The system component(s) 120 may determine if (140) the context score satisfies a condition. For example, the system may determine if the context score indicates a relevance value above a threshold, or if the context score is higher than the context score for another segment already stored in a cache associated with the LM. In another example, the system may determine if the context score is among a top k context scores corresponding to a budget for context data to be retained. If the context score does not satisfy the condition (140:No) the context data and its associated model processing data may be deleted (142) or some other action may be taken. For example, the system component(s) 120 may cause the model processing data (e.g., key-value data) corresponding to that portion to not be stored in the cache, either by not placing it there in the first place or by deleting it from the cache, overwriting it in the cache, etc. If the context score satisfies the condition (140:Yes) the system component(s) 120 may cause the model processing data to be used to respond to the natural language input. For example, the system component(s) 120 may store (144) the model processing data for the portion in the LM cache.

The above process may continue for different portions of the context data so that for each portion the system may repeat steps 134-140. As each portion of context data is processed and given a context score, for each portion whose context score fails to satisfy the condition, it and/or its model processing data may be deleted (142), while each portion whose context score satisfies the condition, its model processing data may be stored in the LM cache/otherwise considered when determining a response to the natural language input. The process may continue for each portion of context data until all portions of context data has been processed. If the context data has not been fully processed (146:No) the system may continue to process the next portion(s) of context data. Once all portions of context data have been processed in this manner (146:Yes), and the LM cache has been populated, the system component(s) 120 may process (148) the input data and the data in the LM cache (e.g., the data for the portions of the context data that have been determined to be relevant) to determine output data responsive to the natural language input. Further details are discussed below.

Figure 2:
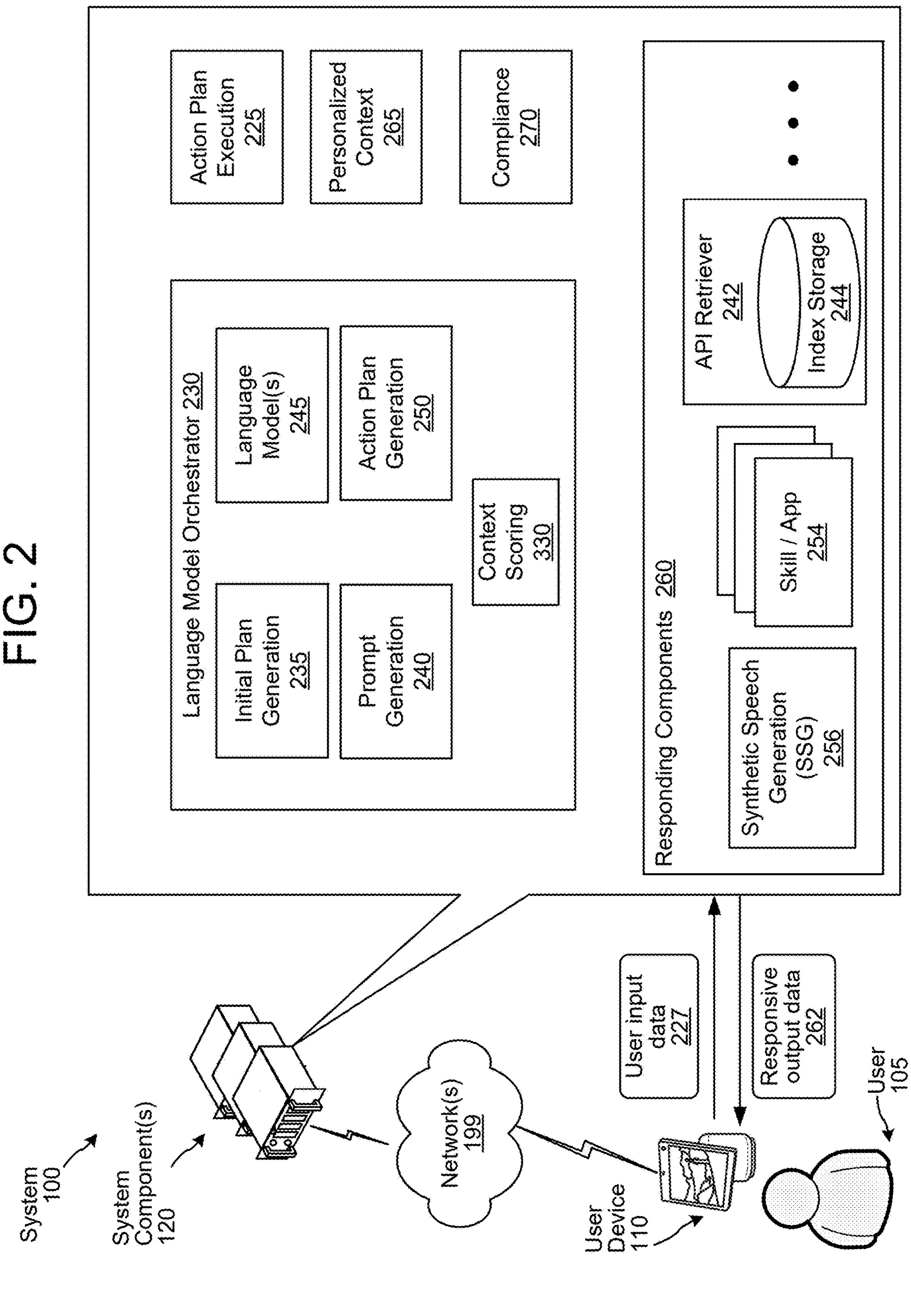
FIG. 2 is a conceptual diagram illustrating example components of a system configured to use a language model to determine a response to a user input, according to embodiments of the present disclosure.

FIG. 2 illustrates further example components included in the system 100 configured to use a language-model based approach to determine an action to be performed in response to a user input and determine a response to be presented to a user 105. In some embodiments, the system component(s) 120 may include various components that may support processing by a language model, such as a language model orchestrator component 230. In example embodiments, the language model orchestrator component 230 may include an initial plan generation component 235, a prompt generation component 240, at least one language model 245, an action plan generation component 250, and a context scoring component 330. The system component(s) 120 may further include an action plan execution component 225 configured to facilitate/cause performance of actions that may be determined by the language model 245. The system component(s) 120 may further include one or more responding components 260 that may perform the actions.

The responding components 260 may be configured to perform an action related to a user input, including, but not limited to retrieving information potentially relevant for determining a response to the user input (e.g., data from a knowledge base, Internet search, database, an application, etc.; context related to the interaction; relevant exemplars for a prompt to the language model; relevant application programming interfaces (APIs); etc.), operating a user device (e.g., a smart home device such as a TV, lights, a kitchen appliance, etc.), determining a synthesized speech output, or other actions described herein. As shown in FIG. 2, the responding components 260 may include an API retriever component 242 (further described below), a synthesized speech generation (SSG) component 256, one or more skill/app components 254 and other components described herein.

APIs are a way for one program/component to interact with another. API calls are a mechanism by which the program/component interact. An API call, or API command, is a message sent to a system component asking an API to perform an action, provide a service or information, or the like. An API call may be formatted for the particular API and may include a particular command, optionally using particular arguments and argument values. API calls may be used for a variety of purposes, such as controlling other devices (e.g., an API call of turn_on_device (device="indoor light 1") corresponds to a command for a component to turn on a device associated with the identifier "indoor light 1"), obtaining information from other components (e.g., an API call of InfoQA.question ("Who is the president of USA?") corresponds to a command for a component to find and provide an answer to the indicated question), and performing other actions (e.g., generating synthesized speech, searching data sources, etc.). The system 100 may interact with the responding components 250 via API calls.

The language model orchestrator component 230 may be configured to orchestrate processing by the language model 245. In some embodiments, the language model 245 may be configured to perform one or more stages of processing, which may be referred to as a task generation stage, an action (or directive) generation stage, and a response generation stage.

The processing stages may be performed in a particular order. For example, during a first stage of processing, the language model 245 may be tasked with performing task generation to generate a list of tasks to be performed in order to respond to a user input. During a second stage of processing, based on the list of tasks, the language model 245 may be tasked with performing action generation to generate action requests (or directives) for a responding component(s) 260 to perform an action(s) related to the tasks/user input. During a third stage of processing, based on information received from the responding component(s) 260, the language model 245 may be tasked with generating a response to the user input and/or causing a component(s) of the system 100 to perform further action(s). Further details are described herein in relation to FIG. 3.

In some cases, a subset of the stages may be performed. For some user inputs, the language model 245 may only perform the task generation stage and the response generation stage, where a response to a user input is generated by the language model 245 using parametric knowledge. For example, for a user input "What kind of fruit is lemon?", the language model 245 may determine that the task is to answer the user's question and may generate a response "Lemon is a citrus fruit that grows on tress" based on the model's parameter knowledge learned during configuration/training operations. In such examples, the language model 245 may not determine an action that is to be performed using a system component, such as sending a request for information to a knowledge base (e.g., the language model 245 may respond without using external knowledge).

In some embodiments, the system may use Retrieval-Augmented Generation (RAG) techniques to inform processing of a language model. RAG techniques may involve referencing an authoritative knowledge base or other type of data source outside of the model's training data sources before generating a response by the model. RAG techniques may extend the already powerful capabilities of language models to specific domains, an organization's internal knowledge base, etc., without the need to retrain the model. In some embodiments, information (e.g., relevant facts, up-to-date information, current/trending topics, etc.) from one or more components (e.g., responding component(s) 260) may be provided to the language model 245 and the model may generate a output based on the received information.

In some embodiments, the language model orchestrator component 230 may be configured to orchestrate processing by multiple different language models, where an individual language model may perform one (or more) of the processing stages described above. For example, a first language model may perform task generation, a second language model may perform action generation, and a third language model may perform response generation. In some embodiments, the language models may be different types of models, for example, a first language model may be a text-to-text generative model, a second language model may be a multi-modal generative model, a third language model may be a text-to-speech generative model, etc. In some embodiments, the language models may be different sizes (e.g., number of parameters), may have different processing capabilities, etc.

Some embodiments may enable use of other components, such as plugins, with the language model 245, where the plugins may add functionality and features to the language model capabilities. For example, the plugins may be used to perform mathematical calculations (e.g., a calculator plugin), statistical analysis (e.g., a statistics plugin), natural language translation, speech generation, etc. For further example, the plugins may additionally, or alternatively, be used to perform an action responsive to a user input based on the response generated by the language model. As a further example, the plugins may cause the language model to process and output according to an enabled plugin, which may result in a different response, reasoning, processing, etc. from the language model than when the plugin is not enabled. In some cases, a user or a system may enable a plugin(s) for use with the language model.

The system component(s) 120 may include other processing components configured to process user inputs and other type of inputs (e.g., sensor data, audio data, data indicative of an event occurring, etc.) received via the user device 110. In example embodiments, the system component(s) 120 may process spoken inputs using ASR processing. The system component(s) 120 may also be configured to process non-spoken inputs, such as gestures, textual inputs, selection of GUI elements, selection of device buttons, etc. The system component(s) 120 may also include other components to understand an input, determine an action to be performed in response to receiving the input, generate an output responsive to the input, and the like. Such other components may perform natural language processing, SSG processing, etc., some of which are described herein in relation to FIG. 6.

Figure 3:
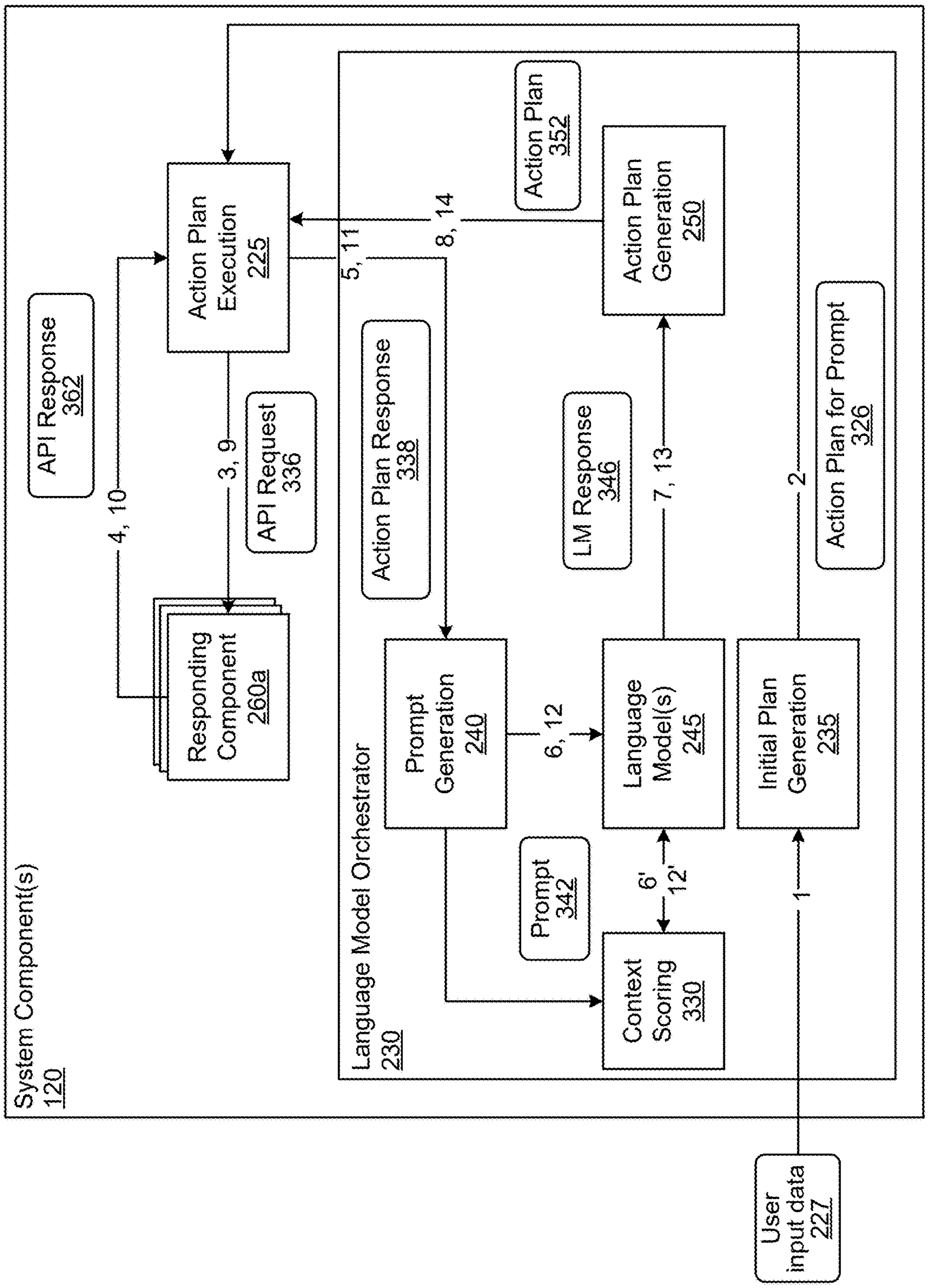
FIG. 3 is a conceptual diagram illustrating example processing of the system configured to use a language model with context data reduction, according to embodiments of the present disclosure.

As shown in FIG. 2, the system component(s) 120 may receive user input data 227, which may be provided to the language model orchestrator component 230 (as shown in FIG. 3). In some instances, the user input data 227 may include one or more types of data, such as text (e.g., a text or tokenized representation of a user input), audio, image, video, etc. Such data may be encoded/embedded data that represent the underlying type of data (e.g., text, audio, image, etc.). For example, the user input data 227 may include text (or tokenized) data when the user input is a natural language user input. In some embodiments, an ASR component 650 of the system 100 may receive audio data representing a spoken natural language user input from the user 105. The ASR component 650 may perform ASR processing on the audio data to determine ASR data representing the spoken user input, which may correspond to a transcript of the user input. As described herein, with respect to FIG. 6, the ASR component 650 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 650 level of confidence that the corresponding hypothesis represents what the user said. The ASR component 650 may also determine token scores corresponding to each token/word of the ASR hypothesis, where the token score indicates the ASR component's 650 level of confidence that the respective token/word was spoken by the user. The token scores may be identified as an entity score when the corresponding token relates to an entity. In some instances, the user input data 227 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 227). As a further example, the user input data 227 may include image data representing information being displayed at the user device 110 (e.g., on-screen context data) when the user 105 provides the user input or at substantially the same time as the user 105 provides the user input. As yet a further example, the user input data 227 may include audio data representing audio signals (e.g., background noise, audio from other devices such as TV, appliances, etc.) occurring in the environment of the user 105 that can be captured by the user device 110 (e.g., audio environment context). As yet a further example, the user input data 227 may include image data representing one or more objects in the environment of the user 105 (e.g., visual environment context). As yet a further example, the system may receive image data including text (and other data), and the user input data 227 may include text determined from the image data using optical character recognition or other techniques.

In some embodiments, the system component(s) 120 may receive input data that may not be provided directly/explicitly by a user. Such other type of input data may be processed in a similar manner as the user input data 227 as described herein. Such other type of input data may be received in response to detection of an event. Example events include change in a device state (e.g., front door opening, garage door closing, TV turned off, thermostat detecting a particular temperature, etc.), occurrence of an acoustic event (e.g., baby crying, appliance beeping, glass breaking, etc.), presence of a user (e.g., a user approaching the user device 110, a user entering the home, etc.), occurrence of an event indicated by a user (e.g., a reminder/notification requested by the user, sporting event score change, start of a TV program, calendar event, etc.), and others. In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100, for example, the language model orchestrator component 230 may process the input data and may cause performance of an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user. The language model orchestrator component 230 may process the input data to generate tasks (e.g., an action plan) that may cause the foregoing example actions to be performed.

FIG. 3 illustrates example processing of the user input data 227 by the system component(s) 120 using the language model 245. Although the figure and discussion of the present disclosure illustrate certain components and steps in a particular order, the components may be implemented in a different manner (as well as certain components removed or added) and the steps described may be performed in a different order (as well as certain steps removed or added) without departing from the present disclosure.

In some embodiments, the language model 245 may perform iterative processing (e.g., multiple processing cycles, multiple processing stages, etc.) with respect to individual user input data 227. Such iterative processing is illustrated and described herein with respect to FIG. 3. For example, in a first iteration of processing the language model 245 may receive a first prompt from the prompt generation component 240, in response to which the language model 245 may determine one or more tasks to be performed with respect to the user input data 227, then at least one of the determined task(s) may be performed via the action plan execution component 225, the results of the performed task(s) may be provided to the language model 245 via a second prompt, in response to which the language model 245 may determine further tasks to be performed or may determine that a (final) response to the user input is determined.

The initial plan generation component 235 may be configured to determine various information relevant to processing of the user input data 227 by the language model orchestrator component 230. The initial plan generation component 235 may generate an action plan (e.g., action plan for prompt data 326) representing one or more tasks/actions to be performed to determine the various relevant information. The relevant information may be included in a prompt to the language model 245. The initial plan generation component 235 may receive (step 1) the user input data 227 representing a user input from the user 105. Based on the user input data 227, the initial plan generation component 235 may determine information relevant for processing the user input data 227 and may output (step 2) the action plan for prompt data 326. The action plan for prompt data 326 may include one or more tasks to be performed to retrieve the relevant information. The tasks may be represented as action descriptions, API requests/calls, API descriptions, requests to a component(s) (e.g., the responding components 260), and the like. Examples tasks that may be included in the action plan for prompt data 326 may relate to obtaining certain information like context data, user profile data, user preferences, available/relevant exemplars, available/relevant APIs, etc.

In example embodiments, the initial plan generation component 235 may determine one or more types of context data potentially relevant for the user input data 227. Types of context data may include user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.), dialog context (e.g., prior user inputs of a dialog, prior system responses of the dialog, dialog topic, actions performed during the dialog, etc.), and the like. As an example, if the user input data 227 corresponds to operation of a device (e.g., the user input corresponds to a smart home domain), the initial plan generation component 235 may determine that device context information, in particular device states for the devices associated with the user/user profile of the user 105, may be relevant information. As another example, if the user input data 227 corresponds to output of media, such as music, movies, TV shows, etc., the initial plan generation component 235 may determine that user context information, in particular user preference for media genre associated with the user/user profile of the user 105, may be relevant information.

Based on the type of context data determined to be relevant, the initial plan generation component 235 may output the action plan for prompt data 326 to include a request for the type(s) of context data. For example, if device context is relevant information, then the action plan for prompt data 326 may include an API call/description corresponding to a component (e.g., a device state component, a smart home component, a user profile storage, etc.) capable of providing device information. As another example, if user context is relevant information, then the action plan for prompt data 326 may include an API call/description corresponding to a component (e.g., a user profile storage, a personalized context component, etc.) capable of providing user information.

In some embodiments, the initial plan generation component 235 may determine one or more components or types of components that may be relevant for processing the user input data 227. As an example, if the user input data 227 corresponds to operation of a device (e.g., the user input corresponds to a smart home domain), the initial plan generation component 235 may determine that components (e.g., APIs) corresponding to device operation or smart home domain may be relevant, and the initial plan generation component 235 may output the action plan for prompt data 326 to include device operation components or smart home domain components. As another example, if the user input data 227 corresponds to output of media, the initial plan generation component 235 may determine components corresponding to media output or music domain may be relevant, and the initial plan generation component 235 may output the action plan for prompt data 326 to include media output components or music domain components.

In some embodiments, the initial plan generation component 235 may determine a query to retrieve exemplars and/or APIs relevant for processing the user input data 227 using the language model 245. As used herein, an exemplar refers to information that may be included in a prompt to a language model that provides an example of how the language model is to process or respond, including, among other things, what actions the language model can request performance of. A prompt may include more than one exemplar. Few shot learning or in-context learning by the language model is enabled by including the exemplars in the prompt. The query (or request) to retrieve relevant exemplars and/or APIs may be included in the action plan for prompt data 326. The query (or an API request based on the query) may be processed by the responding component 260 (e.g., an exemplar retriever component, the API retriever component 242, etc.). The query, in some embodiments, may include the user input data 227 or a portion or representation thereof.

The initial plan generation component 235 may employ one or more techniques to determine relevant information or to determine the tasks to obtain relevant information. Examples of such techniques include using one or more of machine learning models (e.g., classifiers), statistical models, rules engines, etc. to determine the relevant information. The initial plan generation component 235 may determine a topic/category corresponding to the user input data 227, a (semantically or lexically) similar past user input and relevant information corresponding to the similar past user input, and the like.

In example embodiments, the initial plan generation component 235 may use a language model to determine the types of information relevant for processing the user input data 227. The initial plan generation component 235 may input a prompt to the language model, for example, "What types of information is relevant for responding to the user input: [user input data 227]", and the language model may output one or more types of context data, one or more types of components, etc. that may be relevant. In some embodiments, the initial plan generation component 235 may input a prompt to the language model 245 requesting relevant information for the user input data 227.

The action plan for prompt data 326, which includes types of relevant information for the user input data 227 or tasks to be performed to obtain the relevant information, may be processed by the action plan execution component 225 to retrieve the relevant information. The action plan execution component 225 may process the action plan for prompt data 326 to generate one or more requests to perform an action (e.g., API requests 336) for a particular responding component 260. For example, if the action plan for prompt data 326 indicates that device information/context is relevant, then the action plan execution component 225 may generate an API request 336 for a responding component **260*a* capable of providing the device information, where the API request 336 may include a user profile identifier associated with the user 105, a device identifier associated with the user device 110, and/or other information based on information required in the API call for the responding component 260*a***.

The API request 336 may be sent (step 3) to the corresponding responding component(s) 260. The responding component(s) 260 may include components that the action plan execution component 225 may communicate with via API requests or other type requests. As shown in FIG. 2, the responding component(s) 260 may include one or more skill/app components 254, the SSG component 256 (e.g., configured to convert input data to audio data representing synthesized speech), and the API retriever 242 (e.g., configured to provide APIs and corresponding information supported by the system 100). The responding component(s) 260 may also include an orchestrator component 630 (e.g., configured to facilitate processing by other system components 120 such as those shown in FIG. 6), a context source component (e.g., configured to provide user context data, device context data, environmental context data, dialog context data, personalized context data, etc.), a multimodal response component (e.g., configured to respond to a user input via outputs in more than one data form), a content moderation component (e.g., configured to moderate certain types of content such as biased content, harmful content, offensive content, etc.), a smart home devices component (e.g., configured to provide device information such as device state, device capabilities, etc.), a language model-based agent (e.g., a component that uses a language model (e.g., a LLM) or other type of generative model to provide information), an exemplar provider component (e.g., configured to respond to a query for relevant exemplars), a knowledge base component (e.g., including one or more knowledge bases or other structured data that can be searched to obtain information), an entity resolution component (e.g., configured to determine specific entities corresponding to entities represented in a user input or language model output), and the like.

In response to receiving the API request 336 (at step 3), the responding component(s) 260 may provide (step 4) an API response(s) 362 to the action plan execution component 225. At step 3, the API request(s) 336 is based on the action plan for prompt data 326, and thus, at step 4, the API response(s) 362 may include information relevant for processing the user input data 227. In examples, the API response(s) 362 may include potentially relevant context information (e.g., device context, user context, environment context, dialog context, personalized context, etc.), potentially relevant APIs and/or API descriptions for processing the user input data (e.g., API(s) for operating devices, API(s) for outputting media content, etc.), potentially relevant exemplars, and other potentially relevant information requested via the action plan for prompt data 326.

In example embodiments, the API request 336 may be sent to the API retriever component 242. In such cases, the API request 336 may include a query to retrieve relevant APIs based on the user input data 227. The API retriever component 242 may be configured to receive a search query and output one or more APIs or API data corresponding to (e.g., satisfying, matching, etc.) the search query. API data may include an API call, an API description, and other information associated with the API. In some embodiments, the API retriever component 242 may include or may be in communication with an index storage 244 (shown in FIG. 2). The index storage 244 may store various information associated with multiple APIs. Examples of information stored in the index storage 244 include: API/component descriptions (e.g., a description of one or more function that the API can be used to perform), API arguments (e.g., parameter inputs, input types, examples of input values, examples of output values, output type, etc.), identifiers for components corresponding to the API (e.g., alphanumerical component ID, component name, etc.), and other information. In some embodiments, the index storage 244 may include other information associated with the API, such as historical accuracy/defect rate, historical latency value, feedback (e.g., user satisfaction/feedback, system-based feedback), etc. The index storage 244 may also include sample user inputs corresponding to the API, where the sample user input may represent a user input for which the API can perform an action for.

The API retriever component 242 may apply one or more retrieval techniques to determine API data corresponding to the search query. For example, the API retriever component 242 may compare one or more APIs included/represented in the index storage 244 to the user input data 227 represented in the search query to determine one or more APIs (top-k list). Such comparison may involve a semantic comparison between the user input data 227 and the API data. In some embodiments, the API retriever component 242 may use a neural-based retrieval technique that may involve determining an encoded representation of the user input/search query and comparing (e.g., using cosine distance) the encoded representation(s) of the API data in the index storage 244. The relevant APIs may be included in the API response 362.

In a non-limiting example, for a user input "book a flight", the API retriever component 242 may determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), AirlineBookFlight ("departing airport code", "arrival airport code"), etc.).

Some embodiments may include an exemplar provider component that may operate in a similar manner as the API retriever component 242 in terms of implementing one or more retrieval techniques to determine exemplars corresponding to (e.g., satisfying, matching, etc.) a search query based on the user input data 227. The exemplar provider component may search an index storage including various information related to multiple different exemplars. In some embodiments, the index storage may include sample user inputs associated with an exemplar, and the relevant exemplars may be retrieved based on a comparison of the sample user inputs and the user input data 227. The retrieved exemplars may be included in the API response 362.

The information from the API response(s) 362 may be included in a prompt to the language model 245. The action plan execution component 225 may determine action plan response data 338 based on the API response(s) 362. The action plan execution component 225 may combine (e.g., aggregate, summarize, de-duplicate, etc.) multiple API responses 362 to generate the action plan response data 338. In some examples, the action plan response data 338 may be the same or similar to the API response(s) 362. The action plan execution component 225 may send (step 5) the action plan response data 338 to the prompt generation component 240.

Using the action plan response data 338, the prompt generation component 240 may determine prompt 342 for the language model 245. The prompt 342 may be a natural language input (e.g., a natural language request, a natural language instruction, etc.). In some embodiments, the prompt 342 may include information in a manner that the language model 245 is trained for. The prompt generation component 240 may send (step 6) the prompt 342 to the language model 245, where the prompt 342 may include the user input data 227 (or a representation of the user input data 227) and the relevant information for processing the user input data 227. For example, the prompt 342 may include relevant context data, relevant APIs or API descriptions, etc. that may be included in the action plan response data 338. In some embodiments, the prompt 342 may include a request or directive for the language model 245 to respond to the user input data 227. In some embodiments, the prompt 342 may include one or more exemplars (e.g., in-context learning examples) for processing the user input data 227.

The prompt 342 may include indicators (e.g., labels, specific tokens, etc.) to identify certain information. In example embodiments, the prompt 342 may include a "User" indicator (to indicate that the following string of characters/tokens are the user input), an "Exemplar" indicator (to indicate exemplars), and so on.

In some embodiments, the prompts for the language model described herein may include a request for the language model to output a response that satisfies certain conditions. Such conditions may relate to generating a response that is unbiased (toward protected classes, such as gender, race, age, etc.), non-harmful, profanity-free, etc. For example, prompt data generated by a prompt generation component described herein may include "Please generate a polite, respectful, and safe response and one that does not violate protected class policy."

In some embodiments, the prompt 342 may include an indication the processing stages (e.g., the task generation stage, the action generation stage, and the response generation stage) that the language model 245 is to perform. In some examples, for the task generation stage, the prompt 342 may direct the language model 245 to generate an output (e.g., tokens) representing the model's interpretation of the user input and/or one or more tasks to be performed to respond to the user input (the model output may be, for example, the user is requesting [intent of the user input], the user wants to [desired user action], need to determine [information needed to properly process the user input], etc.). For the task generation stage, the prompt 342 may also direct the language model 245 to prioritize a list of tasks to be performed, if more than one task is to be performed and select one (or more) task for the current iteration of processing.

In some examples, for the action generation stage, the prompt 342 may direct the language model 245 to generate an output (e.g. tokens) representing an action(s) (or directive(s)) and/or an API call(s) corresponding to the user input, where performance of the action(s) or execution of the API(s) can be done to retrieve information to determine a response to the user's input, perform the user requested action, retrieve information/data to perform other tasks on the task list, etc. In some examples, for the action generation stage, the prompt 342 may direct the language model 245 to process the results of the action(s)/API(s) determined by the language model 245, and to determine whether a response to the user input can be generated or whether there are further tasks to be performed from the task list.

In some examples, for the response generation stage, the prompt 342 may direct the language model 245 to generate an output (e.g., tokens) representing a response (e.g., a final response) to the user input data 227. In examples, the language model 245 may be directed to generate the response based on the results of performing the action(s)/API(s).

The prompt generation component 240 may send (step 6) the prompt 342 to the language model 245, which may process the prompt 342 to generate a language model (LM) response 346. The LM response 346 may be a natural language output generated based on the prompt 342. The LM response 346 may include text tokens. In other embodiments, where the language model 245 may be a multi-modal model, the LM response 346 may include other types of tokens, for example, audio tokens, image tokens, etc.

Based on receiving the prompt 342 at step 6, the language model 245 may generate the LM response 346 at step 7, where the instant LM response 346 may include outputs corresponding to the task generation stage and the action generation stage. The LM response 346 may include an action for determining information relevant to or responsive to the user input data 227. For example, the LM response 346 may include an action to search a knowledge base (e.g., to find a response to a user question), an action to determine information from a particular skill/app or language model-based agent (e.g., to determine current weather information, to determine a cost of an item, to book travel, etc.), an action to operate a device (e.g., turn on lights, set thermostat to a particular temperature, etc.), an action to request information from the user 105, etc.

In some embodiments, the LM response 346 may include an API or API description corresponding to the determined action. For example, the LM response 346 may include an API to operate a device or an API call(s) to output media content. The language model 245 may determine the actions and/or the API information based on the relevant APIs included in the prompt 342. The language model 245 may generate actions and/or API information that is not based on (e.g., correspond to, is similar to, etc.) the relevant APIs included in the prompt 342 (for example, the language model 245 may generate incorrect/unsupported actions and/or API information).

The LM response 346 may follow the format included in the prompt 342 or that the language model 245 is trained to follow. An example prompt 342 may be:

{

Please process the following user input and context data to determine at least one action or API to execute and generate a response to the user.

First determine a task to perform (use "Task" label), then determine an API to perform the task (use "Action" label), then process the results from the API, and then generate a response to the user input (use "Response" label). You may determine multiple tasks to perform. You may have to process iteratively.

User: Turn on living room TV

Available context:

User devices: "living room TV"=[device id]

"living room TV" device state=Off

Available APIs:

TurnOn.device (device)

TurnVolumeUp.device (device)

SetTVChannel (device, input channel)

}

Based on processing the above example prompt 342, an example LM response 346 (at step 7) may be:

{

Task: User wants to turn on living room TV that is operation of a user device.

Action: I need an API to operate a device. TurnOn.device (device="living room TV")

}

The LM response 346 may be sent (step 7) to the action plan generation component 250, which may determine action plan data 352. As described herein, the language model 245 may generate tokens in sequence, as such, the language model 245 may generate portions of the LM response 346 in a tokens-by-tokens basis. In some embodiments, the LM response 346 may be processed by the action plan generation component 250 based on the language model 245 generating the tokens representing the action or corresponding to the action generation stage.

The action plan generation component 250 may process the LM response 346 to identify one or more actions/APIs generated by the language model 245. In examples, the action plan generation component 250 may parse the tokens/text included in the LM response 346 to extract tokens/text representing an action or API. In some embodiments, the action plan generation component 250 may be configured to determine one or more components (e.g., responding components 260*a*-*n*) configured to perform the identified action or API. Based on the LM response 346, the action plan generation component 250 may determine the action plan data 352, which may in turn cause performance of an action (e.g., execution of API calls) to determine a potential response(s) to the user input. The action plan data 352 may include one or more APIs to be executed, where the APIs may be determined based on (e.g., extracted from) the LM response 346. For example, if the LM response 346 includes an action of "determine weather forecast for today" or an API call of "GetWeather.location ([city])", then the action plan generation component 250 may determine the action plan data 352 to include an API call "GetWeather.location ([city])" and include an identifier for the responding component(s) 260*a* (e.g., a weather skill component). Instead of or in addition to an API call, the action plan data 352 may include a request to perform an action, an API description, etc. In some embodiments, the action plan generation component 250 may determine the responding components 260 based on user permissions, subscriptions, authorization or other use-enabling information associated with the user 105 (e.g., included in user profile data).

In some embodiments, the action plan generation component 250 may be configured to determine more than one responding component 260 to perform the action/execute the API indicated in the LM response 346. In some embodiments, the action plan generation component 250 may determine APIs corresponding to multiple responding components 260. For example, for the "GetWeather.location ([city])" API, the action plan data 352 may include an identifier for a first weather skill component, an identifier for a second weather skill component, an identifier for a search engine component, etc.

The action plan data 352 may be sent (step 8) to the action plan execution component 225. The action plan execution component 225 may identify the APIs in the action plan data 352 and generate executable API calls for the corresponding responding components 260. Based on the action plan data (received at step 8), the action plan execution component 225 may generate an additional (a second) API request (or multiple API requests) 336. The (additional/second) API request(s) 336 may be sent (step 9) to the responding component(s) 260. For example, the action plan execution component 225 may send a first API call to a first responding component 260*a* and a second API call to a second responding component 260*b*.

In some cases, the action plan data 352 may include incomplete API calls and the action plan execution component 225 may be configured to generate executable API calls (e.g., complete API calls) corresponding to the action plan data 352.

The action plan execution component 225 may generate one or more executable API calls including one or more parameters using information included in the action plan data 352 and/or various other contextual information (e.g., speaker recognition results, a user ID, user profile information (e.g., age, gender, location, language, geographic marketplace, etc.), device ID, device profile information, device state indicators, a dialog history, and/or a interaction history associated with the user and/or the device, etc.). In some embodiments, the various contextual information may be contextual information not provided to the language model orchestrator component 230. Prior to generating the executable commands, the action plan execution component 225 may modify (e.g., remove, filter, preempt, etc.) a directive included in the action plan data 352 that is determined to be in conflict with a system operating policy. The action plan execution component 225 may generate one or more additional executable commands corresponding to directives not included in the action plan data 352.

In response to receiving the API request(s) 336 (at step 9), the responding component(s) 260 may send (step 10) an (additional/second) API response(s) 362 to the action plan execution component 225. The action plan execution component 225 may determine (additional/second) action plan response data 338 based on the (additional/second) API response(s) 362. The action plan execution component 225 may combine (e.g., aggregate, summarize, de-duplicate, etc.) multiple API responses 362 to generate the action plan response data 338. In some examples, the action plan response data 338 may be the same or similar to the API response(s) 362. In some examples, the action plan response data 338 may include an identifier associated with the responding component 260 that provided the API response 362. For example, the (additional/second) action plan response data 338 may include first weather information from a first weather skill component, second weather information from a second weather skill component, third weather information from a search engine component, etc. In some embodiments, the action plan execution component 225 may remove/filter information from the API response 362 that is determined to include information not beneficial to the processing by the language model 245.

The action plan execution component 225 may send (step 11) the (additional/second) action plan response data 338 to the prompt generation component 240. The information from the API response(s) 362 may be included, by the prompt generation component 240, in a (additional/second) prompt to the language model 245. The prompt generation component 240 may generate the second prompt 342 to include the action plan response data 338 or a representation thereof. The second prompt 342 may also include information from the prior/first prompt (from step 6). For example, the second prompt 342 may include the user input data 227 (or a representation thereof), the relevant information for processing the user input data 227 (e.g., relevant context data, relevant API information, relevant exemplars, etc.), the processing stages information, and the action plan response data 338 (from step 11). In some embodiments, the second prompt 342 may also include at least a portion of the LM response 346 generated during a prior iteration of processing (e.g., the outputs based on performing the task generation stage and the action generation stage) to indicate actions/results of the prior iteration of processing by the language model 245. The second prompt 342 may include an indicator (e.g., label, identifier, etc.) associated with the action plan response data 338 to indicate, to the language model 245, that the string of characters/tokens following the indicator represent information determined based on performance of the actions determined during the action generation stage.

The second prompt 342 may be sent (step 12) to the language model 245 for processing. At this point, the language model 245 may perform the action generation stage of processing the results of the performed actions, which may involve interpreting or understanding the results included in the action plan response data 338. The language model 245 may generate a (additional/second) LM response 346 based on the second prompt 342 and send (step 13) the resulting LM response data 346 to a downstream component, such as the action plan generation component 250. The second prompt 342 may include a request or directive to the language model 245 to perform further processing with respect to the user input data 227. As described above, the second prompt 342 may provide, among other things, responses/results of performance of the action determined by the language model 245 determined during the prior iteration of processing. The language model 245 may generate further actions to be performed to respond to the user input data 227 (as part of the action generation stage) or may generate a (final/user-facing) response to the user input data 227 (as part of the response generation stage).

An example second prompt 342 may be:

{

Please process the following user input and context data to determine at least one action or API to execute and generate a response to the user.

First determine a task to perform (use "Task" label), then determine an API to perform the task (use "Action" label), then process the results from the API, and then generate a response to the user input (use "Response" label). You may determine multiple tasks to perform. You may have to process iteratively.

User: Turn on living room TV

Available context:

User devices: "living room TV"=[device id]

"living room TV" device state=Off

Available APIs:

TurnOn.device (device)

TurnVolumeUp.device (device)

SetTVChannel (device, input channel)

Prior Iteration:

Action: TurnOn.device (device="living room TV")

TurnOn.device (device="living room TV"); API response: "living room TV" device state=ON

}

Based on the above example prompt 342, an example LM response 346 may be:

{

Task: User wants to turn on living room TV that is operation of a user device.

Action: I need an API to operate a device. TurnOn.device (device="living room TV")

Action result is "living room TV" device state=ON

Response: The living room TV is on now. Can I help you with anything else?

}

As described herein, the language model 245 may generate the LM response 346 on tokens-by-tokens basis. As such, in some examples, the second LM response 346 may include additional tokens (e.g., newly generated tokens) to the first LM response 346 (from step 7). In other examples, the second LM response 346 may include different tokens than the first LM response 346, where the currently generated tokens may represent outputs for further steps of the action generation stage and/or the response generation stage.

The language model 245 may determine further actions/APIs to be performed in a similar manner as described above. Such further actions/APIs may be based on any tasks, included in the task list generated during the task generation stage, that are still to be performed (e.g., a first task of booking a flight may be done, now a second task of booking a hotel is to be performed). Additionally or alternatively, the further actions/APIs may be based on the results included in the action plan response data 338 (at step 11) (e.g., an API response from a responding component 260 may indicate that additional information is needed to perform an action).

The language model 245 may determine a (final) response to the user input, where the response is to be presented to the user 105 via the user device 110. In other cases, the response may be presented via another user device 110 associated with the user 105. The language model 245 may determine the final response based on the results included in the action plan response data 338 (from step 11). For example, the language model 245 may summarize the results, may combine the results, may generate an interpretation of the results, etc. In a non-limiting example, the language model 245 may combine weather information from two or more responding components (e.g., combine high/low temperature information from a first responding component with humidity information from a second responding component). In another non-limiting example, the language model 245 may interpret results from a knowledge base component to determine a response to the specific user query (e.g., from a biographical search result for a historical person, a birthplace and siblings information may be extracted to determine a response to a user query "tell me about [person's] childhood").

In some examples, the language model 245 may generate the further action to be performed is requesting additional information from the user 105. Such further action, in some embodiments, may be labeled as "Response" so that the action plan generation component 250 may cause a request to be output to the user 105.

The second LM response 346 may be sent (step 13) to the action plan generation component 250, which may determine (step 14) the (additional/second) action plan data 352. In some examples, the second LM response 346 sent to the action plan generation component 250 may include further action(s)/API(s) to be executed, which may be labeled with "Action." In some examples, the second LM response 346 may include a final response to the user input, which may be labeled with "Response."

Based on the tokens corresponding to the "Action" label, the action plan generation component 250 may determine the action plan data 352 to include one or more actions, one or more API calls and/or one or more responding components 260 corresponding to the action(s)/API(s) determined by the language model 245.

Based on the tokens corresponding to the "Response" label, the action plan generation component 250 may determine the action plan data 352 to include one or more actions, one or more API calls and/or one or more responding components 260 to present the output tokens to the user 105 as a response to the user input. For example, the action plan data 352 may include an identifier for the SSG component 256 to cause the output tokens, generated by the language model 245, to be presented as synthesized speech. As another example, the action plan data 352 may include an identifier for the responding component 260 capable of generating outputs in more than one form (e.g., a multi-modal output component) to cause the tokens to be presented as synthesized speech, displayed text/graphics, and/or other types of outputs.

The (second) action plan data 352 may be sent (step 14) to the action plan execution component 225, and as described herein, the action plan execution component 225 may determine executable API calls based on the action plan data 352. If the action plan data 352 represents additional actions to be performed, then the action plan execution component 225 may cause the corresponding responding component(s) 260 to perform the additional action(s) and corresponding response(s) (e.g., API responses 362) may be communicated to the prompt generation component 240 (via the action plan execution component 225 and action plan response data 338) to initiate another iteration of processing by the language model 245 with respect to the user input data 227. If the action plan data 352 represents a response to be presented to the user 105, then the action plan execution component 225 may cause the corresponding responding component(s) 260 to determine output data (e.g., responsive output data 262 shown in FIG. 2) that may be presented via the user device 110. For example, the responsive output data 262 may be sent to the user device 110 via the orchestrator component 630 or another system component(s) 120 (described in relation to FIG. 6).

In some embodiments, when further actions are generated by the language model 245 to be performed with respect to the user input data 227, the language model orchestrator 230 may perform another iteration of processing, which may involve generating another prompt 342 to the language model 245, generating another LM response 346 that may be used to determine further action plan data 352. The language model 245 may generate tokens corresponding to the action generation stage and/or the response generation stage during the further iteration.

In some embodiments, when a final response is generated by the language model 245, further processing with respect to the user input data 227 by the language model orchestrator 230 may be ceased (e.g., processing with respect to the user input data 227 by the language model orchestrator 230 may be complete). The language model orchestrator 230 may process with respect to a subsequently received user input, which may or may not be part of the same dialog session as the prior/already processed user input data 227.

The responsive output data 262 may include one or more of output audio data representing synthesized speech, text data for display, image for display, graphics/icons for display, media (e.g., video, music, background music, notification sounds, etc.) for playback, and other data. In some embodiments, the responsive output data 262 may include placement information representing where (e.g., top banner, left portion, center of screen, overlay on current visual, etc.) on the display screen of the user device 110 the output data is to be displayed. In some embodiments, the responsive output data 262 may be determined/provided by the responding component 260. In some embodiments, another system component 120 may process the responsive output data 262 prior to sending to the user device 110 to ensure that the responsive output data is formatted for the particular user device 110.

As understood in the art, LLMs rely on complex processing that use large amounts of memory and other computing resources. One such resource is a large cache or other internal memory to store information during processing and avoid having to recalculate information the LLM has already processed. Thus, as part of its processing, the language model(s) 245 may use a cache or other memory, such as the key-value (KV) cache 430 shown in FIG. 4. To store the information needed for processing by the language model 245 a KV cache may become significantly large as the complexity of the processing task increases, sometimes requiring up to hundreds of gigabytes for a single operation.

To reduce the size of the necessary KV cache 430, and thus improve overall system performance, the system 100 may perform operations (for example by language model 245, context scoring component 330, and/or other components) to score and/or reduce the amount of context data to be processed by the language model 245. Such operations may occur with one or more of the processing passes by the language model 245. For example, such processing (for example, as reflected in FIG. 1 described above and FIG. 4 described below) may occur as part of step 6', step 12', or other processing steps. Performing context reducing operations may reduce the overall amount of context data considered by the language model 245 and may thus improve processing time, reduce latency, reduce use of computing resources, improve accuracy, etc. In turn the size of KV cache 430 may be reduced, also resulting in other gains such as reduced memory size allocated for the KV cache 430, etc.

Figure 4:
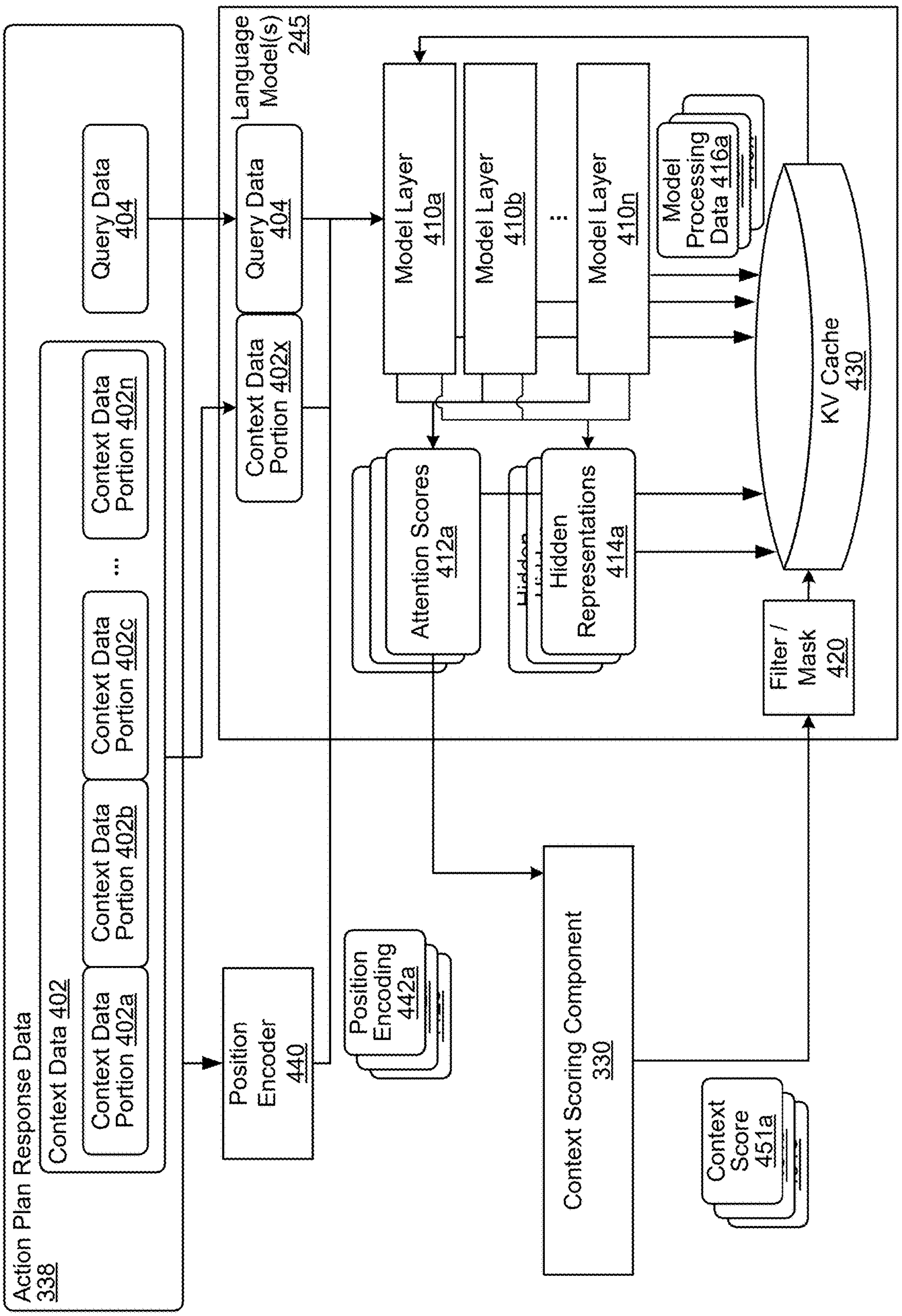
FIG. 4 is a conceptual diagram illustrating example processing of components to perform context data reduction, according to embodiments of the present disclosure.

As shown in FIG. 4, action plan response data, or other data input to the language model 245 may include both data representing a user query (404) as well as data representing context data (402). In certain circumstances the user query data 404 and context data 402 may be received as part of a single input. In other circumstances, the context data 402 may be determined separately from the query data 404. As noted above, the entirety of the context data 402 may be large, for example if it includes many documents, large files, or the like. The context data 402 may be divided into portions (402*a*, 402*b*, 402*c* . . . 402*n*). The context data 402 may already be separated into portions or may be separated by a system component prior to the processing illustrated in FIG. 4. The size of the portions may depend on system configurations such as a memory budget, desired speed/latency of processing, processing capability of individual layers of the language model 245, or the like. Each portion of context data may include a plurality of tokens, where each token represents a segment of that portion of context data. For example, in certain configurations a single token may represent a single word, word portion (such as a suffix), or other segment of data. For example, for multimodal data a single token may represent a portion of audio data, video data, etc. During processing, those tokens are passed to the language model 245 for processing. Similarly, the query data 404 may comprise tokens representing the user query (e.g., the user's natural language input).

As described, the amount of context data 402 may be larger than the context window of the language model 245. If the language model 245 were to process the context data in segments, the language model 245 may lose the overall relationship of the segments of context data to each other, which may result in inaccurate processing of the context data. To account for this, the system may process the context data 402 using a position encoder component 440 which may output position encoding data 442 that maintains information about the relationship of individual segments of context data (e.g., 402*a*, 402*b*, etc.) to the overall context data 402. For example, the position encoder 440 may determine first position encoding data 442*a* for first context data 402*a*, the position encoder 440 may determine second position encoding data 442*b* for second context data 402*b*, and so on. The position encoding data may include rotary position embedding data. The language model 245 may be trained on such rotary position embedding (RoPE) data vectors such that it may process such types of position embedding data during runtime. The rotary position embedding data vectors allow the rescaling of context position to beyond what may be considered by the language model 245 in its context window. For example, if a language model 245 may have a context window of 2000 tokens, but the context data is larger than that (for example 100,000 tokens) the rotary position embedding data vector allows rescaling allowing the language model 245 to consider context position information exceeding its context window (thus "rescaling" the larger context data amount to within the smaller context window). The rotary position embedding may encode the absolute position of a portion of context data with a rotation matrix by rotating each dimension of a query/key representation based on the dimension index (θ) of the context data portion i ($\theta^i$). The dimension index may, for example, be expressed as $\theta^i=10000^{-2(i-1)/d}$, $i\in[1, 2, \ldots, d/2]$.

The rotary position embedding may also be based on LongRoPE techniques, which may scale the dimensions differently distributing the interpolation across the dimensions. For further details on LongRoPE may be found in Yiran Ding, et al., "LongRoPE: Extending LLM Context Window Beyond 2 Million Tokens" (February 2024) which is herein incorporated by reference in its entirety. For LongRoPE, during the pre-training stage, the context window of the language model 245 is effectively extended using LongRoPE position interpolation. During fine-tuning, the model is progressively fine-tuned with a long context dataset to support an extended context window, for example up to a 256 k context length. This fine-tuning step results in a list of inverse frequencies for each dimension in the query/key projections. During inference, the non-uniform scales per dimension, determined during the fine-tuning stage, are applied. This process involves ignoring the existing θi-based frequencies for rotation and loading the LongRoPE inverse frequencies from the model checkpoint.

The position encoding data 442 may correspond to the position of a context data portion within the overall context data. For example, if context data portion 402*x* corresponds to tokens 201-700 of overall context data 402 that is 32,000 tokens long, the position encoding data 442*x* representing context data portion 402*x* may indicate those positions 201-700. Thus, if data corresponding to those specific tokens of context data portion 402*x* are stored in the KV cache 430, they would be stored with their original position encoding data 442*x* (e.g., indicating tokens 201-700 or the like depending on which data resulting from processing context data portion 402*x* is determined to be most relevant). Thus, when the processing of context data 402 is complete and the KV cache 430 has stored the most relevant model processing data 416, etc. relating to the context data 402, when the language model 245 determines a responsive data (e.g., a response to the query data 404) it processes the data in the KV cache 430 using the original position data (e.g., position data relative to the overall context data 402).

In another embodiment, position data may be reassigned depending on whether context data is deemed relevant such that its representative data is stored in the KV cache 430. For example, if overall context data 402 is 32,000 tokens long, but the KV cache 430 is configured to only store the top 2,000 tokens worth of data, the tokens stored in the KV cache 430 may be reassigned position data, regardless of which context data portions correspond to those top 2,000 tokens. In such a configuration, the data in KV cache will be reassigned position data from 0 to 2,000. The reassigned position data may depend on the stored data's placement in the KV cache 430, on the stored data's context score 451 (e.g., ordered in terms of relevance) or other arrangement. Thus, the top k tokens of data will be reassigned position data based on the data's position within the top k. This reassignment of position data may occur continuously, such that each time the KV cache 430 is updated, so is the relative position data. Alternatively, the position data may only be reassigned once the contents of the KV cache 430 is finalized.

In the situation of position data being reassigned continuously, if a desired context window is 8,000 tokens, and context data segments are 4,000 tokens long and the query data 404 500 tokens long, the system may determine (using position encoder 440) position encoding data 442*a* for a first segment of context data 402*a*, giving position data 442*a* corresponding to positions 1-4,000 and position data 442*q* of 4,001 to 4,500 for the query data 404 (as the query data may be appended to the end of a particular context data portion 402 during processing). If the system determines that 2,000 tokens worth of data is relevant from the first segment of context data 402*a* and should be stored in the KV cache 430, the next (e.g., second) segment of context data 402*b* to be processed will be given position encoding data 442*b* corresponding to positions 2,001-6,000 (and the query data will be given position encoding data 442*q* of 6,001-6,500), thus assigning position data based on how much data has been stored in the KV cache 430. Continuing the illustration, if the system determines that 500 tokens worth of data is relevant from the second segment of context data 402*b* and should be stored in the KV cache 430, the next (this time third) segment of context data 402*c* to be processed will be given position encoding data 442*c* corresponding to positions 2,501-6,500 (and the query data will be given position encoding data 442*q* of 6,501-7,000), which is because by the time the third segment of context data 402*c* is processed, the KV cache 430 will have stored 2,500 tokens worth of data (e.g., 2,000 tokens corresponding to the first segment of context data 402*a* and 500 tokens corresponding to the second segment of context data 402*b*).

In the reassignment configuration, when the processing of context data 402 is complete and the KV cache 430 has stored the most relevant model processing data 416, etc. relating to the context data 402, when the language model 245 determines a responsive data (e.g., a response to the query data 404) it processes the data in the KV cache 430 using the reassigned position data (e.g., position data indicating the stored data's relative position to the remainder of the most relevant stored data that fit within the context window/size of the KV cache 430).

To determine which portions of the context data 402 may be most relevant to the processing of the user's input (represented by query data 404). Portions of the context data 402 may be processed in turns by the language model 245 with resulting data processed by the context scoring component 330 to determine respective context scores 451. For example, the language model 245 may perform one processing pass where it processes one portion of context data 402*x* (e.g., the first portion of context data 402*a*), the position encoding data 442*x* (that may include rotary position embedding data) for that context data portion (e.g., first position encoding data 442*a* that corresponds to the first context data portion 402*a*), along with the query data 404 to determine model processing data that may be stored in the key-value (KV) cache 430 of the language model 245. As illustrated, the language model 245 may include a plurality of layers, 410*a*, 410*b* . . . 410*n*. Each layer may produce layer output data which may include model processing data 416. The model processing data 416 may be KV data output by the respective layer. For example, first layer 410*a* may output model processing data 416*a*, second layer 410*b* may output model processing data 416*b*, and so forth until final layer 410*n* of the language model 245 outputs model processing data 416*n*. The model processing data 416 may also include hidden representation/state data 414, which may be stored by the KV cache 430.

As part of a processing pass by the language model 245, each layer 410 may generate attention scores 412. Such scores may represent how closely the particular portion of context data corresponds to the user query (e.g., how well the key and the query match) as determined by the particular model layer (e.g., transformer layers of the language model 245). Thus, for a processing pass for processing a first context data portion 402*a* and the query data 404, a first model layer 410*a* may generate first attention score(s) 412*a*, a second model layer may generate second attention score(s) 412*b*, etc. where those attention scores go with the first context data portion 402*a*. The grouped attention scores for each layer for that first context data portion may be sent to the context scoring component 330 for further processing as discussed below. The individual attention scores may correspond to specific tokens of the context data portion being processed. Thus, if the first context data portion 402*a* comprises one thousand tokens, each layer 410 may output one thousand attention scores, depending on system configuration, number of heads in a particular model layer, etc. The attention scores may also be stored in the KV cache 430 if the respective context portion satisfies a condition (discussed herein) indicating that the context portion is relevant to the input query. The KV cache may also store other data, such as hidden representation data 414, corresponding to model processing of the particular context portion.

The individual attention scores 412*a* . . . 412*n* generated by the language model 245 for processing related to a particular context data portion 402*x* may be sent to the context scoring component 330 to determine a context score 451*x* for that particular context data portion 402*x*. Thus, for example, the attention scores determined by the various model layers 410 as a result of a processing pass involving a first context data portion 402*a*, first position encoding data 442*a* (corresponding to the first context data portion), and query data 404 may be sent to the context scoring component 330 to determine a context score 451*a* for that first context data portion. Similarly the attention scores determined by the various model layers 410 as a result of a processing pass involving a second context data portion 402*b*, second position encoding data 442*b* (corresponding to the second context data portion), and query data 404 may be sent to the context scoring component 330 to determine a second context score 451*b* for that second context data portion. In certain embodiments the context scoring component 330 may use all available attention scores for a context data portion to determine a context score, in other embodiments the context scoring component 330 may only use certain of the attention scores.

To determine the respective context score 451 for a context data portion, the context scoring component 330 may sum the attention scores for the processing related to the particular context portion. The resulting sum may be the context score 451 for the particular context portion. Alternatively, the context scoring component 330 may determine an average of the attention scores for the processing related to the particular context portion. The resulting average may be the context score 451 for the particular context portion.

In certain configurations the system may also determine which data to store in the KV cache 430 based on data groupings. For example, a plurality of attention heads in a particular model layer 410 may be considered a group, for example 4 heads per a group. In this situation the attention scores 412 for the group may be aggregated (e.g., averaged, added, or otherwise) to determine a group attention score for the group. That group attention score may be used by the filter/mask component 420 to determine if the data for that group is to be stored in the KV cache 430.

During runtime, the system 100 may process the context score 451 for a particular portion of context data to determine if the context score 451 satisfies a condition. For example, for example, the system may determine if the context score 451 is above or below a threshold, within a certain range, is larger or smaller than some other context score, within a top k allocation of context scores, etc. Such a determination may be performed by filter/mask component 420. If the condition is satisfied, the filter/mask component 420 may determine that the model processing data (e.g., KV data) for the particular portion of context data (for example that was output by model layer 410*n* for the respective processing pass) should be used to determine a response to the user query. Thus the filter/mask component 420 may coordinate operations so that the respective portion's model processing data is stored in KV cache 430. If the condition is not satisfied (for example, the context score is too low or indicates a relevance below that of some other context data portion), the filter/mask component 420 may cause the respective portion's model processing data to not be stored in KV cache 430, for example by not storing it there at all or by deleting it/overwriting it if it was previously put in the KV cache 430.

Storing of data in the KV cache 430 depending on the condition may result in certain data for a particular layer being stored in the KV cache 430 while other data for the same layer may not be. For example, for model layer 410*x*, which may include a number of processing heads, a portion of the resulting processing data, such as a first portion of hidden representation data 414*x* from model layer 410*x* may be considered relevant (e.g., have a high context score 451) while a second portion of hidden representation data 414*x* from model layer 410*x* may be considered not relevant (e.g., have a low context score 451). In such a situation, the first portion of hidden representation data 414*x* may be stored in KV cache 430 while the second portion of hidden representation data 414*x* may not be stored in KV cache 430. Similar distinctions may be made with model processing data 416 or other data resulting from model processing. Thus, the system may store only portions of model processing data that are determined to be relevant, even if this may result in certain data for a context portion being stored in the KV cache 430 while other data for the same context portion may not be. Such relevance determinations may be different for data resulting from certain model layers, attention heads, etc.

Figure 5:
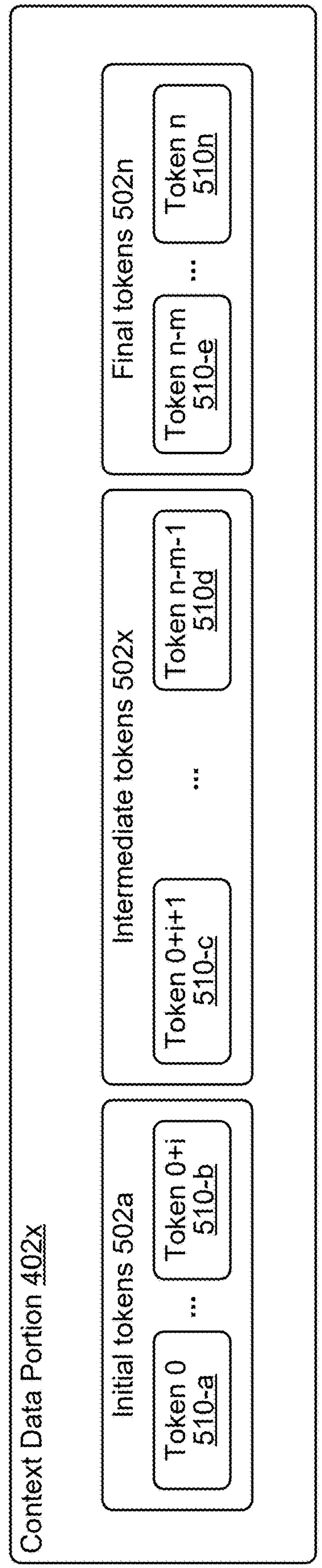
FIG. 5 is a conceptual diagram illustrating token groupings of a context data portion, according to embodiments of the present disclosure.

As noted above, one of the conditions for determining relevance of a particular portion of context data is its relevance with regard to a top k allocation of context scores. The size of the top k may correspond to a storage budget. Thus, for example, if a context score 451 for a particular portion of context data is not within the top k budget, the data for that context portion may not be stored in the cache. The system, however, may have different storage budgets depending on system configuration. Further, different storage budgets may be allocated to segments of context data differently. For example, while the middle segments of context data may have varying degrees of potential relevance, the initial segments and final segments of a particular portion of context data may have potentially more relevance. Thus, it may improve system performance to save data related to these initial and final segments and to the most relevant portions of the middle segments. An example of this may be applied to context data as shown in FIG. 5.

As discussed above, context data 402 may include a variety of portions of context data 402*x*. Such portions may come in varying sizes of chunks or may be uniform in size. The portions may also correspond to discrete items like documents, videos, images, or the like. As shown in FIG. 5, a context data portion 402*x* may include a number of different sections, each comprising a plurality of tokens. As shown, the context data portion 402*x* may include an initial group of tokens a for example token 0 510-*a* through token 0+i 510-*b*. The context data portion 402*x* may conclude with a final group of tokens 502*n*, which may include token n-m 510-*e* through token n 510*n*. And in between the initial group and final group the context data portion 402*x* may include an intermediate group of tokens 502*x* which may include token x+i+1 510-*c* through token n−m−1 510*d*. The size of the group of initial tokens (e.g., the value of i) may be configurable depending on the system. Further, the size of the group of final tokens (e.g., the value of m) may also be configurable depending on the system. With regards to caching information relating to context data for processing by the language model 245, the system may have a certain budget for maintaining information regarding initial tokens, another budget for maintaining information regarding final tokens, and still another budget for maintaining information regarding the most relevant intermediate tokens. These budgets may be similar or may be different depending on system configuration. For example, in one configuration, the system may be configured to maintain in cache information related to the initial 256 tokens (e.g., i=256) of a context data portion, information related to the final 500 tokens (e.g., m=500) of a context data portion, and information related to the most relevant 8000 intermediate tokens of a context data portion. In such a scenario the system may determine context scores for the intermediate tokens 502*x* of the context data portion 402*x* in the manner described above and may maintain information only relating the 8000 tokens within that intermediate group that have the highest context scores. Information related to lower scoring tokens within that intermediate group will not be stored in cache/will be discarded. But the system may also cache information related to the initial 256 tokens and the final 500 tokens, and ultimately use the contents of the cache for determining a response to the user query (represented by query data 404).

The above process for scoring different portions of context data will continue for data related to other portions of context data 402 determined to be potentially relevant in responding to the user query. While the process may be performed for all such portions of context data, in certain circumstances certain portions of context data may not be processed in the described manner. For each portion of context data 402*x* processed, the system may determine position encoding data 442, attention score data 412, and use such data to determine a context score 451. That context score 451 may then be used to determine whether to discard data corresponding to the certain portion of context data or whether to maintain it (for example in KV cache 430) for processing with regard to the user query. For example, if the KV cache 430 is already storing its budgeted amount of information, if a first context score 451*a* for a first context portion 402*a* determined by the system indicates a greater relevance (e.g., is higher) than that of a second score 451*b* for a second context data portion 402*b* whose information is stored in the KV cache 430, the information for the second context portion will be removed from the cache and the information for the first context portion will be added to the cache. As the language model 245 continues its processing, the information deemed most relevant will remain in the KV cache 430 and thus be used to determine the ultimate output of language model 245 that will be used to respond to the user query. In this manner, only data related to the most relevant portions of context data will be stored in the KV cache 430 and used to determine a response to the user query. By removing/deleting data related to less relevant portions of context data, the system may conserve computing resources, reduce latency, and otherwise improve system performance.

Referring again to FIG. 2, as shown, the system component(s) 120 may include a compliance component 270. In some embodiments, the compliance component 270 may be included in the language model orchestrator component 230. In other embodiments, the compliance component 270 may be one of the responding components 260 and the action plan generation component 250 may cause the action plan execution component 225 to send an API request to the compliance component 270 when processing by the compliance component 270 is to be performed.

The compliance component 270 may be configured to determine whether an output of the language model 245 is appropriate for output to the user 105. In some embodiments, the compliance component 270 may be configured to process language model output (e.g., the LM response 346) representing outputs/tokens generated by the language model 245 during processing of the user input data 227. The model output may include tokens generated during the task generation stage, the action generation stage or the response generation stage. The compliance component 225 may also or instead determine whether an input to the language model 245 (e.g., a user request, an output of another system component of the system 100) is appropriate and/or that the input will result in the language model 245 generating an output that is appropriate to present to the user 105. For this determination, the compliance component 270 may process the user input data 227 or a portion or representation thereof. In some embodiments, the compliance component 270 may process other data (e.g., context data, user profile data, system configuration/policy data, etc.) to determine whether the generated response and/or the input is appropriate.

In some embodiments, the compliance component 270 may determine whether the model output/LM response 346 and/or the user input data 227 corresponds to training data used to configure the language model 245 (e.g., the model output or user input is semantically or lexically similar to the training data, the model output or user input corresponds to functionality (e.g., topics, categories, actions, etc.) that the model is trained for, etc.). Additionally or alternatively, the compliance component 270 may determine whether the model output/LM response 346 and/or the user input data 227 corresponds to one or more words or phrases determined to be confidential, sensitive, or offensive. Additionally or alternatively, the compliance component 270 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some embodiments, the compliance component 270 may use one or more techniques to determine whether the model output or the user input is appropriate; such techniques may include a rules-engine, a word-based similarity determination, a machine learning model based determination (e.g., using a classifier to classify model output or user input to appropriate category or inappropriate category), etc.

In some embodiments, the compliance component 270 may process the user input data 227 when it is received by the language model orchestrator component 230 and in some cases may process in parallel to the language model orchestrator component 230. In some embodiments, the compliance component 270 may process the model output as the language model 245 generates the output tokens. In other embodiments, the compliance component 270 may process the model output after the language model 245 has generated tokens for a particular processing stage (e.g., after the task generation stage is completed, after the action generation stage is completed, after the response generation stage is completed, etc.).

If the compliance component 270 determines that the model output or the user input data 227 is appropriate, then the language model orchestrator component 230 may continue processing with respect to the user input data 227. If the compliance component 270 determines that the model output is not appropriate, then one or more remedial actions may be performed. One example remedial action may involve prompting the language model 245 to generate a new/modified model output. In such examples, additional prompt data may be determined, which may include the original prompt data, the initial model output, and an indication that the initial model output is not appropriate for output to the user 105. The additional prompt data may include a request or directive to the language model 245 to generate model output that is appropriate for output to the user 105. Another example remedial action may involve the system outputting a generic/template response (e.g., "Sorry, I can't help you with that" or "I cannot answer questions for [inappropriate category])") or a request for a rephrased input (e.g., "can you rephrase that").

In some embodiments, the compliance component 270 may cause the system to output a response indicating where (e.g., a source external to the system components 120) the included/outputted information may be found. For example, the response may include an indication of a source of the training data or the data (e.g., API response 362) that the response is based on (e.g., the indication may include a description of an owner of the intellectual property rights corresponding to the training data/the response information, a hyperlink to the source, etc.). In some embodiments the compliance component 270 may determine that the model generated response is based on (e.g., summarizing, using, similar to, etc.) data that protected by intellectual property rights (or other laws), and instead of outputting the language model generated response (e.g., LM response 346). In some embodiments the responsive output data 262 may include an indication of the intellectual property rights owner, may include access to a source of the data (e.g., website link), or may include a template response (e.g., "I cannot process this request" or "The requested data is protected by intellectual property rights", etc.). In some embodiments, the compliance component 270 may determine that the user input data 227 involves processing data or outputting data that is protected by certain intellectual property rights (or other laws). An example of such a user input may be "write a story about [protected character]" or "draw an image of [protected character] doing [some action]", where the owner of intellectual property rights in the [protected character] may not allow use, copying, or other operations. In response, the system may cease or prevent processing by the language model orchestrator 230 of the user input data 227, and the system may output a template response (e.g., "I cannot process this request" or "The requested data is protected by intellectual property rights", etc.).

As shown in FIG. 2, the system component(s) 120 may include a personalized context component 265. In some embodiments, the personalized context component 265 may be included in the language model orchestrator component 230. In other embodiments, the personalized context component 265 may be considered one of the responding components 260 (such as in the example of a request to determine relevant context data such as that described herein with respect to the operations of FIG. 3) and the action plan generation component 250 may cause the action plan execution component 225 to send an API request to the personalized context component 265.

The personalized context component 265 may be configured to determine personalized context data including context data corresponding to the user input data 227 and/or the user 105. In some embodiments, the initial plan generation component 235 may request personalized context data to include in the prompt 342. In other embodiments, other system component(s) 120, such as the language model 245, may request personalized context data (e.g., to determine a personalized response to a user input). The personalized context data may include user preferences, past user inputs, past system outputs for past user inputs from the user 105, past skill/app usage, user-defined items, etc. The personalized context component 265 may infer user preferences from user-provided preferences, past user interactions by the user 105, information related to users similar to the user 105, etc. In some embodiments, the personalized context component 265 may employ one or more techniques to determine the personalized context data; such techniques may include using a rules-engine, using one or more machine learning models (including a generative model), topic determination techniques, neural retrieval search techniques, etc.

In examples, the personalized context component 265 may receive the user input data 227, task data representing a current task being performed/processed, and/or model output indicating that an ambiguity exists or additional information is needed to generate a response to the user input. The personalized context component 265 may receive a query in some examples, which may include an identifier for the user 105. In a non-limiting example, the personalized context component 265 may receive the following example requests: "Does the user prefer to use [Music Service 1] or [Music Service 2] for playing music," or "What kind of music does the user like?" The personalized context component 265 determine example personalized context data including "The user prefers [Music Service 1]" or "The user likes [music genre]").

Figure 6:
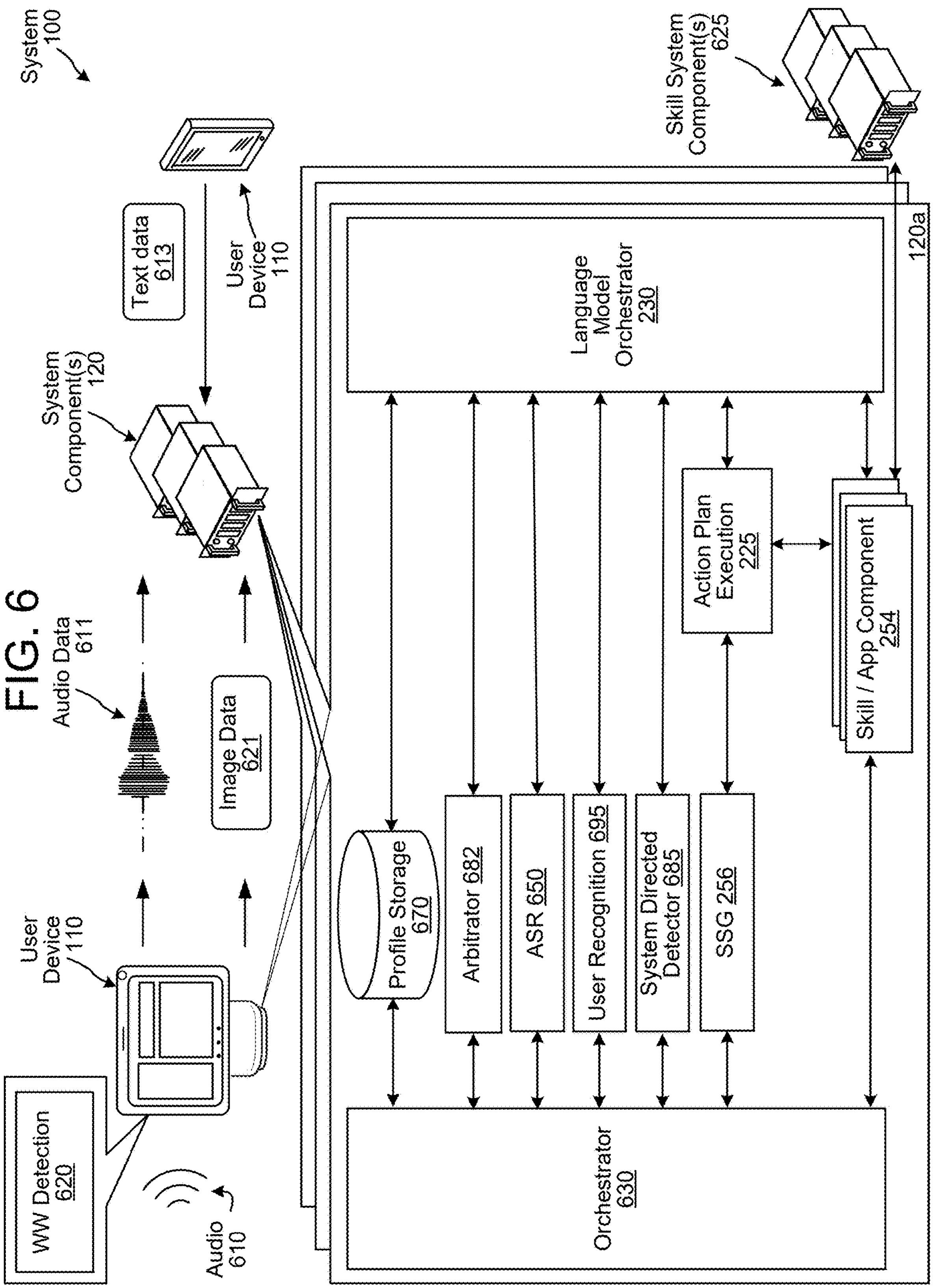
FIG. 6 is a conceptual diagram illustrating example components of the system, according to embodiments of the present disclosure.

Further information related to the SSG component 256 and the skill/app component 254 is described herein in relation to FIG. 6.

In some embodiments, the language model 245 may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks. Some techniques may involve supervised fine-tuning (SFT), unsupervised fine-tuning, semi-supervised fine-tuning, or other types of learning.

In some embodiments, one or more of the system components 120 described herein may be configured to begin processing with respect to data as soon as the data or a portion of the data is available to the components (e.g., processing in a streaming fashion). Some system components may be generative components/models that can begin processing with respect to portions of data as they are available, instead of waiting to initiate processing after the entirety of data is available. For example, the language model 245 may start processing a first portion of the prompt 342 while the prompt generation component 235 determines a second/subsequent portion of the prompt 342. As another example, the action plan generation component 250 may start processing a first portion of the LM response 346 while the language model 245 is generating a second/subsequent portion of the LM response 346.

The system 100 may operate using various components as described in FIG. 6. The various components may be located on same or different physical devices. Communication between various components may occur directly or across a network(s) 199. The user device 110 may include audio capture component(s), such as a microphone or array of microphones of a user device 110, captures audio 610 and creates corresponding audio data. Once speech is detected in audio data representing the audio 610, the user device 110 may determine if the speech is directed at the user device 110/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 621 representing those image(s) to the system component(s). The image data 621 may include raw image data or image data processed by the user device 110 before sending to the system component(s). The image data 621 may be used in various manners by different components of the system to perform operations such as determining whether a user is directing an utterance to the system, interpreting a user command, responding to a user command, etc. In some embodiments, the user input data 227 (described in relation to FIG. 2) may include one or more the audio 610, the audio data 611, the text data 613 and the image data 621.

The wakeword detection component 620 of the user device 110 may process the audio data, representing the audio 610, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using an RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 110 may "wake" and begin transmitting audio data 611, representing the audio 610, to the system component(s) 120. The audio data 611 may include data corresponding to the wakeword; in other embodiments, the portion of the audio corresponding to the wakeword is removed by the user device 110 prior to sending the audio data 611 to the system component(s) 120. In the case of touch input detection or gesture-based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Castle Adventure" for a game play skill/system component(s) 120*c*) and/or such skills/systems may be coordinated by one or more skill component(s) 254 of one or more system component(s) 120.

The user device 110/system component(s) 120 may also include a system directed input detector 685. The system directed input detector 685 may be configured to determine whether an input to the system (for example speech, a gesture, etc.) is directed to the system or not directed to the system (for example directed to another user, etc.). The system directed input detector 685 may work in conjunction with the wakeword detection component 620. If the system directed input detector 685 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input and may output a green indicator if a system directed input is detected. Other such configurations are possible.

Upon receipt by the system component(s) 120, the audio data 611 may be sent to an orchestrator component 630 and/or the language model orchestrator component 230. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 120. In embodiments where the orchestrator component 630 is not included in the system component(s) 120, the audio data 611 may be sent directly to the language model orchestrator component 230. Further, in such embodiments, each of the components of the system component(s) 120 may be configured to interact with the language model orchestrator component 230, the action plan execution component 225, the API provider component, and/or other component(s).

In some embodiments, the system component(s) 120 may include an arbitrator component 682, which may be configured to determine whether the orchestrator component 630 and/or the language model orchestrator component 230 are to process with respect to user input data. In some embodiments, the language model orchestrator component 230 may be selected to process with respect to the audio data 611 only if the user 105 associated with the audio data 611 (or the user device 110 that captured the audio 610) has previously indicated that the language model orchestrator component 230 may be selected to process with respect to user inputs received from the user 105.

In some embodiments, the arbitrator component 682 may determine the orchestrator component 630 and/or the language model orchestrator component 230 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the language model orchestrator component 230. For further example, the arbitrator component 682 may determine whether the device from which the audio data 611 is received is associated with an indicator representing the audio data 611 is to be processed by the orchestrator component 630 and/or the language model orchestrator component 230. As an even further example, the arbitrator component 682 may determine whether the user (e.g., determined using data output from the user recognition component 695) from which the audio data 611 is received is associated with a user profile including an indicator representing the audio data 611 is to be processed by the orchestrator component 630 and/or the language model orchestrator component 230. As another example, the arbitrator component 682 may determine whether the audio data 611 (or the output of the ASR component 650) corresponds to a request representing that the audio data 611 is to be processed by the orchestrator component 630 and/or the language model orchestrator component 230 (e.g., a request including "let's chat" may represent that the audio data 611 is to be processed by the language model orchestrator component 230).

In some embodiments, if the arbitrator component 682 is unsure (e.g., a confidence score corresponding to whether the orchestrator component 630 and/or the language model orchestrator component 230 is to process is below a threshold), then the arbitrator component 682 may send the audio data 611 to both of the orchestrator component 630 and the language model orchestrator component 230. In such embodiments, the orchestrator component 630 and/or the language model orchestrator component 230 may include further logic for determining further confidence scores during processing representing whether the orchestrator component 630 and/or the language model orchestrator component 230 should continue processing, as is discussed further herein below.

The arbitrator component 682 may send the audio data 611 to an ASR component 650. In some embodiments, the component selected to process the audio data 611 (e.g., the orchestrator component 630 and/or the language model orchestrator component 230) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the language model orchestrator component 230. In instances where the text data is sent to the arbitrator component 682, the arbitrator component 682 may send the text data to the component selected to process the audio data 611 (e.g., the orchestrator component 630 and/or the language model orchestrator component 230). The text data sent from the ASR component 650 to the arbitrator component 682, the orchestrator component 630, and/or the language model orchestrator component 230 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 630 may cause a NLU component (not shown) to perform processing with respect to the ASR data generated by the ASR component 650. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill/app component 254, a skill system component(s) 625, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 105. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 630. The orchestrator component 630 may forward the NLU results data to a skill component(s) 254. If the NLU results data includes a single NLU hypothesis, the NLU component and the orchestrator component 630 may direct the NLU results data to the skill component(s) 254 associated with the NLU hypothesis. If the NLU results data includes an N-best list of NLU hypotheses, the NLU component and the orchestrator component 630 may direct the top scoring NLU hypothesis to a skill component(s) 254 associated with the top scoring NLU hypothesis. The system may also include a post-NLU ranker which may incorporate other information to rank potential interpretations determined by the NLU component.

In some embodiments, after determining that the orchestrator component 630 and/or the language model orchestrator component 230 should process with respect to the user input, the arbitrator component 682 may be configured to periodically determine whether the orchestrator component 630 and/or the language model orchestrator component 230 should continue processing with respect to the user input. For example, after a particular point in the processing of the orchestrator component 630 (e.g., after performing NLU, prior to determining a skill component 254 to process with respect to the user input, prior to performing an action responsive to the user input, etc.) and/or the language model orchestrator component 230 (e.g., after selecting a task to be completed, after receiving the action response data from the one or more components, after completing a task, prior to performing an action responsive to the user input, etc.) the orchestrator component 630 and/or the language model orchestrator component 230 may query the arbitrator component 682 has determined that the orchestrator component 630 and/or the language model orchestrator component 230 should halt processing with respect to the user input. As discussed above, the system 100 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the language model orchestrator component 230 to begin processing with respect to a user input as soon as a portion of data associated with the user input is available (e.g., the ASR data, context data, output of the user recognition component 695. Thereafter, once the arbitrator component 682 has enough data to perform the processing described herein above to determine whether the orchestrator component 630 and/or the language model orchestrator component 230 is to process with respect to the user input, the arbitrator component 682 may inform the corresponding component (e.g., the orchestrator component 630 and/or the language model orchestrator component 230) to continue/halt processing with respect to the user input at one of the logical checkpoints in the processing of the orchestrator component 630 and/or the language model orchestrator component 230.

A skill system component(s) 625 may communicate with a skill/app component(s) 254 within the system component(s) 120 directly with the orchestrator component 630 and/or the action plan execution component 225, or with other components. A skill system component(s) 625 may be configured to perform one or more actions. An ability to perform such action(s) may sometimes be referred to as a "skill." That is, a skill may enable a skill system component(s) 625 to execute specific functionality in order to provide data or perform some other action requested by a user. For example, a weather service skill may enable a skill system component(s) 625 to provide weather information to the system component(s) 120, a car service skill may enable a skill system component(s) 625 to book a trip with respect to a taxi or ride sharing service, an order pizza skill may enable a skill system component(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill/app component 254 dedicated to interacting with the skill system component(s) 625. Unless expressly stated otherwise, reference to a skill, skill device, or skill component may include a skill/app component 254 operated by the system component(s) 120 and/or skill/app operated by the skill system component(s) 625. Moreover, the functionality described herein as a skill or skill may be referred to using many different terms, such as an action, bot, app, or the like. The skill component 254 and or skill system component(s) 625 may return output data to the orchestrator component 630.

The system component(s) includes a SSG component 256. The SSG component 256 may generate audio data (e.g., synthesized speech) from text data, text embeddings, text tokens, audio tokens, audio embeddings, etc., using one or more different methods. Data input to the SSG component 256 may come from a skill/app component 254, the orchestrator component 630, the action plan execution component 225, or another component of the system. In one method of synthesis called unit selection, the SSG component 256 matches data against a database of recorded speech. The SSG component 256 selects matching units of recorded speech and concatenates the units together to form audio data. In another method of synthesis called parametric synthesis, the SSG component 256 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 611 representing the commands to the system component(s) 120 for processing, after which the system component(s) 120 may return output data that can cause the user device 110 to engage its camera.

The system component(s) 120/the user device 110 may include a user recognition component 695 that recognizes one or more users using a variety of data. However, the disclosure is not limited thereto, and the user device 110 may include the user recognition component 695 instead of and/or in addition to the system component(s) 120 without departing from the disclosure.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the arbitrator component 682, the orchestrator component 630, and/or the language model orchestrator component 230 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of components (e.g., responding component(s) 260 such as skills/apps, language model-based agents, knowledge bases, components for a particular domain, etc.) that the user has enabled. When a user enables a component, the user is providing the system component(s) with permission to allow the component to execute with respect to the user's inputs. If a user does not enable a component, the system component(s) may not invoke that component to execute with respect to the user's inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) 120 may receive the audio data 611 from the user device 110, to recognize speech corresponding to a spoken input in the received audio data 611, and to perform functions in response to the recognized speech. In at least some embodiments, these functions involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may direct the user device 110 to output an audible response (e.g., using SSG processing performed by an on-device SSG component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

In at least some embodiments, the user device 110, may send the audio data 611 to the wakeword detection component 620. If the wakeword detection component 620 detects a wakeword in the audio data 611, the wakeword detection component 620 may send an indication of such detection to the user device 110. In response to receiving the indication, the audio data 611 may be sent to the system component(s) 120 and/or the ASR component of the user device 110. The wakeword detection component 620 may also send an indication, to the user device 110, representing a wakeword was not detected. In response to receiving such an indication, the audio data 611 may not be sent to the system component(s) 120, and the user device 110 may prevent the ASR component of the user device 110 from further processing the audio data 611. In this situation, the audio data 611 can be discarded.

In some embodiments, the user device 110 may include some or all of the components illustrated in FIG. 6 and/or discussed herein above with respect to the system component(s) 120. In other embodiments, the components illustrated in FIG. 6 and/or discussed herein with respect to the system component(s) 120 may be distributed across the user device 110 and the system component(s) 120.

In at least some embodiments, the components of the user device 110 (e.g., on-device components) may not have the same capabilities as the components of the system component(s) 120. For example, on-device components may be configured to generate a response to only a subset of the natural language user inputs that may be handled by the system component(s) 120. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s) 120.

In some embodiments, the system component(s) 120 and the user device 110 may process as described herein to generate responses to the user input corresponding to the audio data 611. The system component(s) 120 may send the response to the user device 110 and the user device 110 may determine whether to output the response generated by the system component(s) 120 or the response generated by the user device 110. In some embodiments, the system component(s) 120 may be configured to perform a portion of the processing described herein, such as a portion of processing not performable by the user device 110 and send the result of such processing to the user device 110. The user device 110 may be configured to determine whether to use the result to complete processing to generate the response to the user device 110.

In at least some embodiments, the user device 110 may include, or be configured to use, one or more skill/app components that may operate similarly to the skill/app component(s) 254. The skill/app component(s) on the user device 110 may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 110 may be in communication with one or more skill system component(s) 625. For example, a skill system component(s) 625 may be located in a remote environment (e.g., separate location) such that the user device 110 may only communicate with the skill system component(s) 625 via the network(s) 199. However, the disclosure is not limited thereto. For example, in at least some embodiments, a skill system component(s) 625 may be configured in a local environment (e.g., home server and/or the like) such that the user device 110 may communicate with the skill system component(s) 625 via a private network, such as a local area network (LAN).

Figure 7:
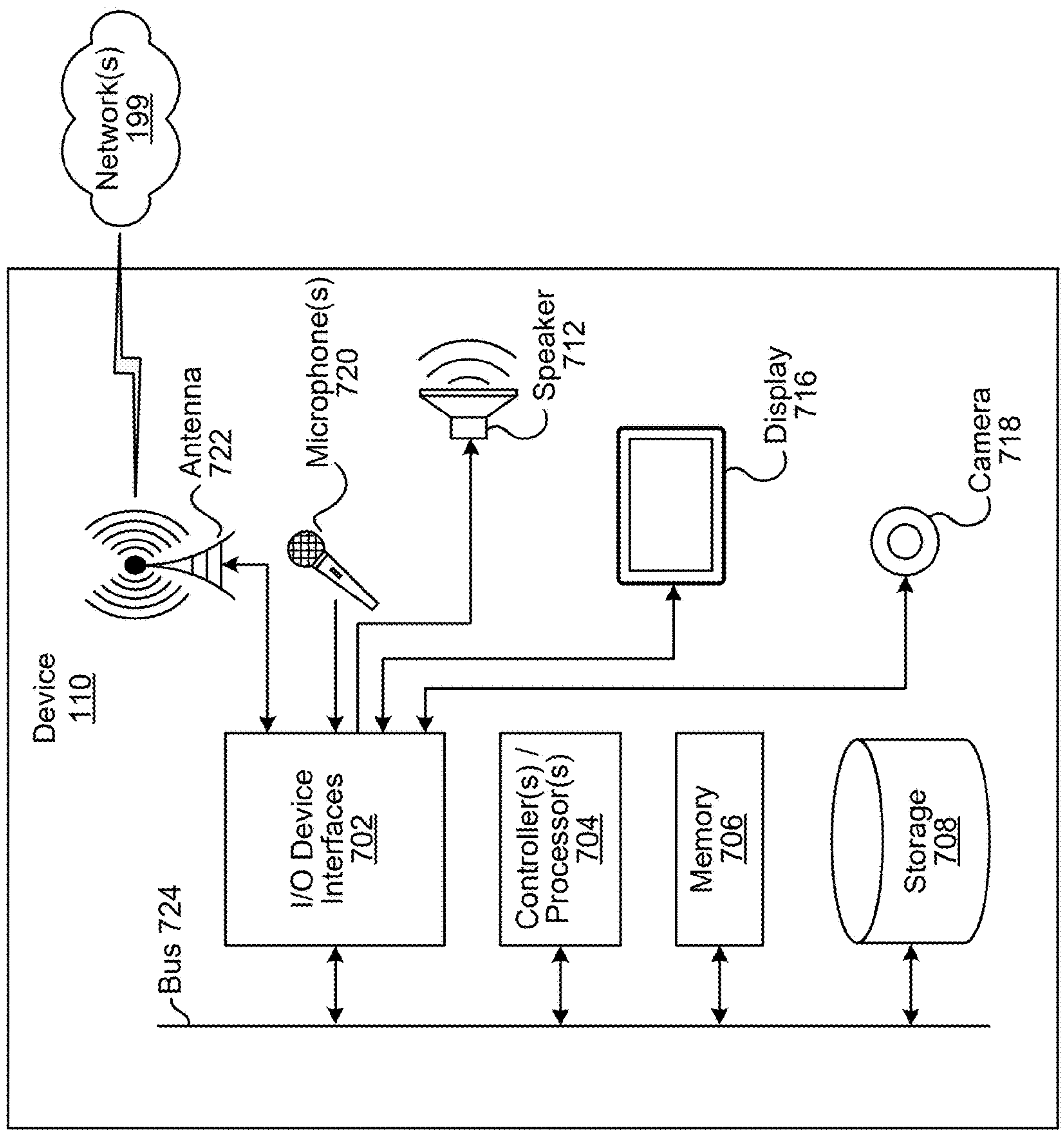
FIG. 7 is a block diagram conceptually illustrating example components of a device, according to embodiments of the present disclosure.
Figure 8:
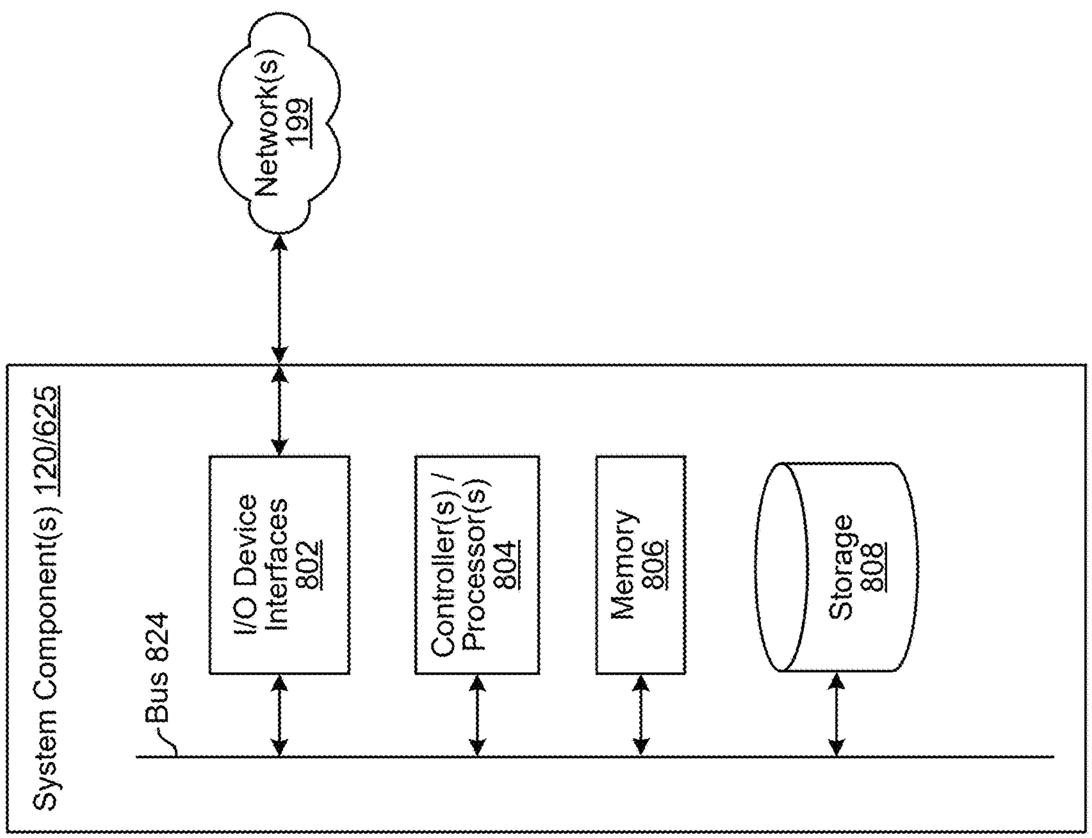
FIG. 8 is a block diagram conceptually illustrating example components of a system, according to embodiments of the present disclosure.

FIG. 7 is a block diagram conceptually illustrating a user device 110 that may be used with the system. FIG. 8 is a block diagram conceptually illustrating example components of a remote device, such as the system component(s) 120, which may assist with ASR processing, NLU processing, language model processing, etc., and a skill system component(s) 625. System component(s) (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/625) may be included in the overall system 100 of the present disclosure, such as one or more natural language processing system component(s) 120 for performing ASR processing, one or more natural language processing system component(s) 120 for performing NLU processing, one or more skill system component(s) 625, etc. In operation, each of these systems may include computer-readable and computer-executable instructions that reside on the respective device (120/625), as will be discussed further below.

Each of these devices (110/120/625) may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each device (110/120/625) may also include a data storage component (708/808) for storing data and controller/processor-executable instructions. Each data storage component (708/808) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (702/802).

Computer instructions for operating each device (110/120/625) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/625) includes input/output device interfaces (702/802). A variety of components may be connected through the input/output device interfaces (702/802), as will be discussed further below. Additionally, each device (110/120/625) may include an address/data bus (724/824) for conveying data among components of the respective device. Each component within a device (110/120/625) may also be directly connected to other components in addition to (or instead of) being connected to other components across the bus (724/824).

Referring to FIG. 7, the user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the user device(s) 110, the system component(s) 120, or a skill system component(s) 625 may include their own dedicated processors, memory, and/or storage. Alternatively, one or more of the components of the user device(s) 110, the system component(s) 120, or a skill system component(s) 625 may utilize the I/O interfaces (702/802), processor(s) (704/804), memory (706/806), and/or storage (708/808) of the user device(s) 110, the system component(s) 120, or the skill system component(s) 625, respectively. Thus, the ASR component 650 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system component(s) 120, and a skill system component(s) 625, as described herein, are illustrative, and may be located as a stand-alone device or may be included, in whole or in part, as a component of a larger device or system. As can be appreciated, a number of components may exist either as a system component(s) and/or on user device 110. Unless expressly noted otherwise, the system version of such components may operate similarly to the user device version of such components and thus the description of one version (e.g., the system version or the local user device version) applies to the description of the other version (e.g., the local user device version or system version) and vice-versa.

Figure 9:
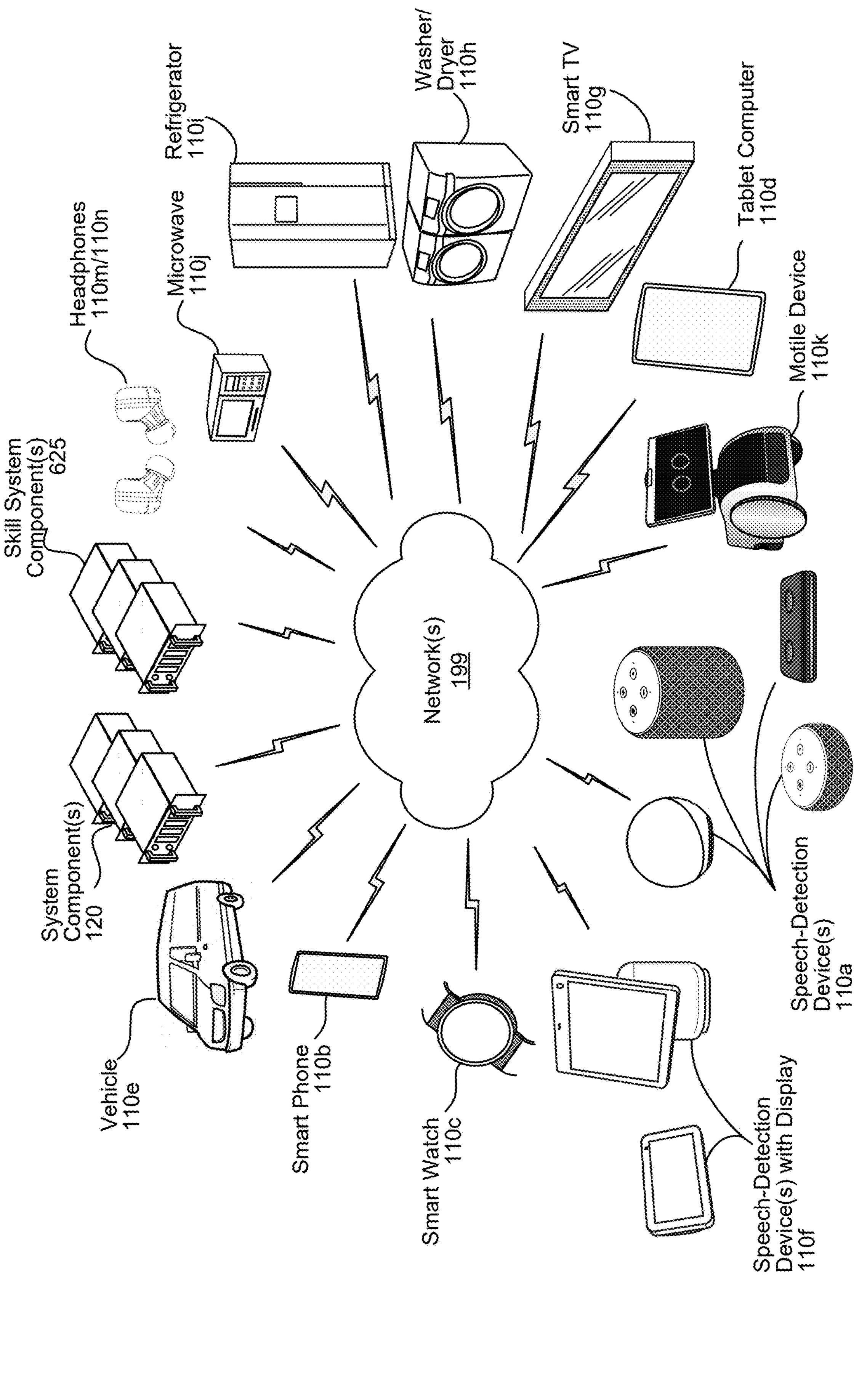
FIG. 9 illustrates an example of a network for use with the overall system, according to embodiments of the present disclosure.

As illustrated in FIG. 9, multiple devices (110*a*-110*n*, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile user device 110*k* (e.g., a robot), headphones 110*m*/110*n* (e.g., wireless earbuds, wireless headphones), etc., may be connected to the network(s) 199 through a wireless service provider, over a Wi-Fi or cellular network connection, or the like. Other devices are included as network-connected support devices, such as the system component(s) 120, the skill system component(s) 625, and/or others. The support devices may connect to the network(s) 199 through a wired connection or wireless connection. Networked devices may capture audio using one-or-more built-in or connected microphones or other audio capture devices, with processing performed by components of the same device or another device connected via the network(s) 199, such as the system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
- receiving input data comprising first data representing a natural language query and context data to be used to determine a response to the natural language query, the context data comprising a plurality of portions including a first portion and a second portion, wherein the first portion comprises:
  - a plurality of initial tokens,
  - a plurality of intermediate tokens following the plurality of initial tokens, and
  - a plurality of final tokens following the plurality of intermediate tokens;
- processing a first token of the plurality of intermediate tokens to determine first position data corresponding to at least one rotary position embedding representing a position of the first token with respect to the context data;
- processing a second token of the plurality of intermediate tokens to determine second position data corresponding to at least one rotary position embedding representing a position of the second token with respect to the context data;
- processing the first token, the first position data, and the first data, using a large language model (LLM) to determine a first plurality of attention scores and first model output data;
- summing the first plurality of attention scores to determine a first context score representing a relevance of the first token to the natural language query;
- processing the second token, the second position data, and the first data, using the LLM to determine a second plurality of attention scores and second model output data;
- summing the second plurality of attention scores to determine a second context score representing a relevance of the second token to the natural language query;
- based at least in part on the first context score, storing the first model output data in a cache associated with the LLM;
- based at least in part on the second context score, declining to store the second model output data in the cache; and
- processing contents of the cache using the LLM to determine language model output data corresponding to a response to the natural language query.

2. The computer-implemented method of claim 1, wherein determination of the first plurality of attention scores and first model output data comprises:
- processing the first token, the first position data, and the first data using a first layer of the LLM to determine a first subset of attention scores and first layer output data; and
- processing the first layer output data using a further portion of the LLM to determine a second subset of attention scores,
- wherein the first plurality of attention scores comprises the first subset and the second subset.

3. The computer-implemented method of claim 1, further comprising:
- processing the plurality of initial tokens to determine third position data corresponding to at least one rotary position embedding representing at least one position of the plurality of initial tokens with respect to the context data;
- processing the third position data, the plurality of initial tokens, and the first data using the LLM to determine third model output data; and
- storing the third model output data in the cache.

4. The computer-implemented method of claim 3, further comprising:
- processing the plurality of final tokens to determine fourth position data corresponding to at least one rotary position embedding representing at least one position of the plurality of final tokens with respect to the context data;
- processing the fourth position data, the plurality of final tokens, and the first data using the LLM to determine fourth model output data; and
- storing the fourth model output data in the cache.

5. A computer-implemented method comprising:
- receiving first data representing a natural language input;
- determining second data representing context data to be used to process the natural language input, wherein an amount of the context data exceeds a size of a storage of a language model;
- determining first position data representing a first portion of the second data, wherein the first portion does not exceed the size of the storage;
- processing the first position data, the first data, and the first portion of the second data using the language model to determine a plurality of attention scores and first model processing data;

determining, based at least in part on the plurality of attention scores, a first score representing a relevance of the first portion of the second data to the natural language input;

determining the first score fails to satisfy a condition;

based at least in part on the first score failing to satisfy the condition, causing the first model processing data to not be stored in the storage;

determining a remainder of the context data has been processed with regard to relevance to the natural language input; and processing contents of the storage using the language model to determine language model output data corresponding to a response to the natural language input.

6. The computer-implemented method of claim 5, wherein determining the first score comprises:

summing the plurality of attention scores to determine a summation value; and determining an average attention score using the summation value, wherein the first score comprises the average attention score.

7. The computer-implemented method of claim 5, further comprising:

processing the first data, the first position data, and the first portion of the second data using a first layer of the language model to determine a first attention score, and first layer output data; and processing the first layer output data using a second layer of the language model to determine a second attention score and a second hidden representation, wherein the plurality of attention scores comprises the first attention score and the second attention score.

8. The computer-implemented method of claim 7, further comprising, prior to determining the remainder of the context data has been processed:

determining second position data representing a second portion of the second data;

processing the first data, the second position data, and the second portion of the second data using the first layer of a language model to determine a third attention score and third layer output data;

processing the third layer output data using the second layer of the language model to determine a fourth attention score and fourth layer output data;

processing the fourth layer output data using a further portion of the language model to determine a second plurality of attention scores and second model processing data corresponding to the second portion of the second data;

determining a second context score using the third attention score, the fourth attention score, and the second plurality of attention scores;

determining the second context score satisfies the condition; and based at least in part on the second context score satisfying the condition, causing the second model processing data to be stored in the storage.

9. The computer-implemented method of claim 8, further comprising:

storing, by the storage, third model processing data corresponding to a third portion of the second data;

determining a third context score representing a relevance of the third portion of the second data to the natural language input;

wherein determining the second context score satisfies the condition comprises determining the second context score is greater than the third context score; and deleting the third model processing data from the storage.

10. The computer-implemented method of claim 8, wherein:

the second portion comprises:

a plurality of initial tokens, a plurality of intermediate tokens following the plurality of initial tokens, and a plurality of final tokens following the plurality of intermediate tokens;

the second model processing data corresponds to a subset of the plurality of intermediate tokens; and the method further comprises:

determining third model processing data corresponding to the plurality of initial tokens;

determining fourth model processing data corresponding to the plurality of final tokens; and causing the third model processing data and the fourth model processing data to be used to be stored in the storage.

11. The computer-implemented method of claim 5, wherein the first model processing data comprises key-value data.

12. The computer-implemented method of claim 5, wherein the first position data comprises rotary position embedding data based at least on a position of the first portion with respect to the context data.

13. A system, comprising:

at least one processor; and at least one memory comprising instructions that, when executed by the at least one processor, cause the system to:

receive first data representing a natural language input;

determine second data representing context data to be used to process the natural language input, wherein an amount of the context data exceeds a size of a storage of a language model;

determine first position data representing a first portion of the second data, wherein the first portion does not exceed the size of the storage;

process the first position data, the first data, and the first portion of the second data using the language model to determine a plurality of attention scores and first model processing data;

determine, based at least in part on the plurality of attention scores, a first score representing a relevance of the first portion of the second data to the natural language input;

determine the first score fails to satisfy a condition;

based at least in part on the first score failing to satisfy the condition, cause the first model processing data to not be stored in the storage;

determine a remainder of the context data has been processed with regard to relevance to the natural language input; and process contents of the storage using the language model to determine language model output data corresponding to a response to the natural language input.

14. The system of claim 13, wherein the instructions that cause the system to determine the first score comprise instructions that, when executed by the at least one processor, cause the system to:

sum the plurality of attention scores to determine a summation value; and determine an average attention score using the summation value, wherein the first score comprises the average attention score.

15. The system of claim 13, wherein the at least one memory further comprises instructions that, when executed by the at least one processor, further cause the system to:

process the first data, the first position data, and the first portion of the second data using a first layer of the language model to determine a first attention score, and first layer output data; and process the first layer output data using a second layer of the language model to determine a second attention score and a second hidden representation, wherein the plurality of attention scores comprises the first attention score and the second attention score.

16. The system of claim 15, wherein the at least one memory further comprises instructions that, when executed by the at least one processor, further cause the system to, prior to determination that the remainder of the context data has been processed:

determine second position data representing a second portion of the second data;

process the first data, the second position data, and the second portion of the second data using the first layer of a language model to determine a third attention score and third layer output data;

process the third layer output data using the second layer of the language model to determine a fourth attention score and fourth layer output data;

process the fourth layer output data using a further portion of the language model to determine a second plurality of attention scores and second model processing data corresponding to the second portion of the second data;

determine a second context score using the third attention score, the fourth attention score, and the second plurality of attention scores;

determine the second context score satisfies the condition; and based at least in part on the second context score failing to satisfy the condition, cause the second model processing data to be stored in the storage.

17. The system of claim 16, wherein the at least one memory further comprises instructions that, when executed by the at least one processor, further cause the system to:

store, by the storage, third model processing data corresponding to a third portion of the second data;

determine a third context score representing a relevance of the third portion of the second data to the natural language input;

wherein the instructions that cause the system to determine that the second context score satisfies the condition comprise instructions that, when executed by the at least one processor, cause the system to determine the second context score is greater than the third context score; and delete the third model processing data from the storage.

18. The system of claim 16, wherein:

the second portion comprises:

a plurality of initial tokens, a plurality of intermediate tokens following the plurality of initial tokens, and a plurality of final tokens following the plurality of intermediate tokens;

the second model processing data corresponds to a subset of the plurality of intermediate tokens; and the at least one memory further comprises instructions that, when executed by the at least one processor, further cause the system to:

determine third model processing data corresponding to the plurality of initial tokens;

determine fourth model processing data corresponding to the plurality of final tokens; and cause the third model processing data and the fourth model processing data to be stored in the storage.

19. The system of claim 13, wherein the first model processing data comprises key-value data.

20. The system of claim 13, wherein the first position data comprises rotary position embedding data based at least on a position of the first portion with respect to the context data.

* * * * *